(12) United States Patent (10) Patent No.: US 8,667,415 B2
Rudolph et al. (45) Date of Patent: Mar. 4, 2014

(54) WEB WIDGETS

(75) Inventors: Chris Rudolph, Camas, WA (US); Mac Murrett, Portland, OR (US); Kurt Revis, Portland, OR (US)

(73) Assignee: Apple Inc., Cupertino, CA (US)

( * ) Notice: Subject to any disclaimer, the term of this patent is extended or adjusted under 35 U.S.C. 154(b) by 1001 days.

(21) Appl. No.: 11/834,578

(22) Filed: Aug. 6, 2007

(65) Prior Publication Data

US 2009/0044138 A1 Feb. 12, 2009

(51) Int. Cl.
*G06F 3/048* (2013.01)
*G06F 3/00* (2006.01)

(52) U.S. Cl.
USPC ........... 715/774; 715/761; 715/762; 715/765; 715/766

(58) Field of Classification Search
USPC .......... 715/765, 766, 207, 750, 764, 761, 762
See application file for complete search history.

(56) References Cited

U.S. PATENT DOCUMENTS

| | | |
|---|---|---|
| 4,752,893 A | 6/1988 | Guttag et al. |
| 5,168,441 A | 12/1992 | Onarheim et al. |
| 5,289,574 A | 2/1994 | Sawyer |
| 5,297,250 A | 3/1994 | Leroy et al. |
| 5,351,995 A | 10/1994 | Booker |
| 5,357,603 A | 10/1994 | Parker |
| 5,388,201 A | 2/1995 | Hourvitz et al. |
| 5,416,890 A | 5/1995 | Beretta |
| 5,481,665 A | 1/1996 | Okada et al. |
| 5,490,246 A | 2/1996 | Brotsky et al. |
| 5,522,022 A | 5/1996 | Rao et al. |
| 5,537,630 A | 7/1996 | Berry et al. |
| 5,564,002 A | 10/1996 | Brown |
| 5,564,022 A | 10/1996 | Debnath et al. |
| 5,588,098 A | 12/1996 | Chen et al. |
| 5,602,997 A | 2/1997 | Carpenter et al. |
| 5,638,501 A | 6/1997 | Gough et al. |
| 5,644,737 A | 7/1997 | Tuniman et al. |
| 5,644,739 A | 7/1997 | Moursund |
| 5,651,107 A | 7/1997 | Frank et al. |
| 5,657,049 A | 8/1997 | Ludolph et al. |
| 5,659,693 A | 8/1997 | Hansen et al. |
| 5,659,694 A | 8/1997 | Bibayan |
| 5,666,416 A | 9/1997 | Micali |
| 5,671,343 A | 9/1997 | Kondo et al. |

(Continued)

FOREIGN PATENT DOCUMENTS

DE 102 42 378 3/2004
EP 548586 6/1993

(Continued)

OTHER PUBLICATIONS

"Sidekick", [Online] [Retrieved on Oct. 12, 2009] Retrieved from the Internet at URL: http://en.widipedia.org/wiki/Sidekick; 5 pages.

(Continued)

*Primary Examiner* — Nicholas Augustine
*Assistant Examiner* — Meseker Takele
(74) *Attorney, Agent, or Firm* — Fish & Richardson P.C.

(57) ABSTRACT

A media authoring tool includes web widgets for creating page elements for various types of media (e.g., websites, blogs, broadcasts, slide shows, multimedia presentations). A widget inspector associated with the widget can be used to modify the behavior of the widget.

31 Claims, 11 Drawing Sheets

(56) References Cited

U.S. PATENT DOCUMENTS

| | | |
|---|---|---|
| 5,689,664 A | 11/1997 | Narayanan et al. |
| 5,708,764 A | 1/1998 | Borrel et al. |
| 5,710,884 A | 1/1998 | Dedrick |
| 5,721,848 A | 2/1998 | Joseph |
| 5,727,135 A | 3/1998 | Webb et al. |
| 5,731,819 A | 3/1998 | Gagne et al. |
| 5,742,285 A | 4/1998 | Ueda |
| 5,754,174 A | 5/1998 | Carpenter et al. |
| 5,760,773 A | 6/1998 | Berman et al. |
| 5,764,229 A | 6/1998 | Bennett |
| 5,764,238 A | 6/1998 | Lum et al. |
| 5,790,120 A | 8/1998 | Lozares et al. |
| 5,793,376 A | 8/1998 | Tanaka et al. |
| 5,796,402 A | 8/1998 | Ellison-Taylor |
| 5,801,703 A | 9/1998 | Bowden et al. |
| 5,809,230 A | 9/1998 | Pereira |
| 5,835,692 A | 11/1998 | Cragun et al. |
| 5,835,693 A | 11/1998 | Lynch et al. |
| 5,838,316 A | 11/1998 | Arruza |
| 5,838,906 A * | 11/1998 | Doyle et al. .................. 715/205 |
| 5,870,734 A | 2/1999 | Kao |
| 5,877,741 A | 3/1999 | Chee et al. |
| 5,877,762 A | 3/1999 | Young et al. |
| 5,878,219 A | 3/1999 | Vance et al. |
| 5,883,639 A | 3/1999 | Walton et al. |
| 5,900,876 A | 5/1999 | Yagita et al. |
| 5,903,896 A | 5/1999 | Waldman et al. |
| 5,917,436 A | 6/1999 | Endo et al. |
| 5,920,659 A | 7/1999 | Iverson et al. |
| 5,929,852 A | 7/1999 | Fisher et al. |
| 5,933,148 A | 8/1999 | Oka et al. |
| 5,949,409 A | 9/1999 | Tanaka et al. |
| 5,963,191 A | 10/1999 | Jaaskelainen, Jr. |
| 5,978,579 A | 11/1999 | Buxton et al. |
| 5,999,948 A | 12/1999 | Nelson et al. |
| 6,005,568 A | 12/1999 | Simonoff et al. |
| 6,006,231 A | 12/1999 | Popa |
| 6,011,562 A | 1/2000 | Gagne et al. |
| 6,031,937 A | 2/2000 | Graffagnino |
| 6,045,446 A | 4/2000 | Ohshima |
| 6,061,695 A | 5/2000 | Slivka et al. |
| 6,075,543 A | 6/2000 | Akeley |
| 6,128,010 A | 10/2000 | Baxter et al. |
| 6,133,915 A | 10/2000 | Arcuri et al. |
| 6,144,381 A | 11/2000 | Lection et al. |
| 6,154,601 A | 11/2000 | Yaegashi et al. |
| 6,166,748 A | 12/2000 | Van Hook et al. |
| 6,167,533 A | 12/2000 | Potterveld et al. |
| 6,188,399 B1 | 2/2001 | Voas et al. |
| 6,191,797 B1 | 2/2001 | Politis |
| 6,195,664 B1 | 2/2001 | Tolfa |
| 6,211,890 B1 | 4/2001 | Ohba |
| 6,246,418 B1 | 6/2001 | Oka |
| 6,259,432 B1 | 7/2001 | Yamada et al. |
| 6,266,053 B1 | 7/2001 | French et al. |
| 6,266,430 B1 | 7/2001 | Rhoads |
| 6,272,484 B1 | 8/2001 | Martin et al. |
| 6,272,558 B1 | 8/2001 | Hui et al. |
| 6,275,831 B1 | 8/2001 | Bodnar et al. |
| 6,278,448 B1 | 8/2001 | Brown et al. |
| 6,278,450 B1 | 8/2001 | Arcuri et al. |
| 6,300,947 B1 | 10/2001 | Kanevsky |
| 6,304,684 B1 | 10/2001 | Niczyporuk et al. |
| 6,307,574 B1 | 10/2001 | Ashe et al. |
| 6,310,621 B1 | 10/2001 | Gagne et al. |
| 6,311,232 B1 | 10/2001 | Cagle et al. |
| 6,313,851 B1 | 11/2001 | Matthews, III et al. |
| 6,321,314 B1 | 11/2001 | Van Dyke |
| 6,333,753 B1 | 12/2001 | Hinckley |
| 6,344,855 B1 | 2/2002 | Fisher et al. |
| 6,353,437 B1 | 3/2002 | Gagne |
| 6,369,823 B2 | 4/2002 | Ohba |
| 6,369,830 B1 | 4/2002 | Brunner et al. |
| 6,396,520 B1 | 5/2002 | Ording |
| 6,401,104 B1 | 6/2002 | LeRue et al. |
| 6,411,274 B2 * | 6/2002 | Watanabe et al. ............. 345/684 |
| 6,411,301 B1 | 6/2002 | Parikh et al. |
| 6,412,021 B1 | 6/2002 | Nguyen et al. |
| 6,421,058 B2 | 7/2002 | Parikh et al. |
| 6,424,348 B2 | 7/2002 | Parikh |
| 6,434,744 B1 | 8/2002 | Chamberlain et al. |
| 6,452,600 B1 | 9/2002 | Parikh et al. |
| 6,456,290 B2 | 9/2002 | Parikh et al. |
| 6,457,034 B1 | 9/2002 | Morein |
| 6,466,218 B2 | 10/2002 | Parikh et al. |
| 6,466,237 B1 | 10/2002 | Miyao et al. |
| 6,469,714 B2 | 10/2002 | Buxton et al. |
| 6,483,524 B1 | 11/2002 | Petchenkine et al. |
| 6,484,261 B1 | 11/2002 | Wiegel |
| 6,487,560 B1 | 11/2002 | LaRue et al. |
| 6,489,963 B2 | 12/2002 | Parikh et al. |
| 6,493,733 B1 * | 12/2002 | Pollack et al. ................ 715/207 |
| 6,512,522 B1 | 1/2003 | Miller et al. |
| 6,515,682 B1 | 2/2003 | Washington et al. |
| 6,525,736 B1 | 2/2003 | Erikawa et al. |
| 6,526,174 B1 | 2/2003 | Graffagnino |
| 6,535,892 B1 | 3/2003 | LaRue et al. |
| 6,536,041 B1 | 3/2003 | Knudson et al. |
| 6,542,160 B1 | 4/2003 | Abgrall |
| 6,542,166 B1 | 4/2003 | Washington et al. |
| 6,544,295 B1 | 4/2003 | Bodnar |
| 6,571,328 B2 | 5/2003 | Liao et al. |
| 6,573,896 B1 | 6/2003 | Ribadeau et al. |
| 6,577,317 B1 | 6/2003 | Duluk, Jr. et al. |
| 6,580,430 B1 | 6/2003 | Hollis et al. |
| 6,590,592 B1 | 7/2003 | Nason et al. |
| 6,609,977 B1 | 8/2003 | Shimizu et al. |
| 6,614,444 B1 | 9/2003 | Duluk, Jr. et al. |
| 6,618,048 B1 | 9/2003 | Leather |
| 6,636,214 B1 | 10/2003 | Leather et al. |
| 6,639,595 B1 | 10/2003 | Drebin et al. |
| 6,661,426 B1 | 12/2003 | Jetha et al. |
| 6,664,958 B1 | 12/2003 | Leather et al. |
| 6,664,962 B1 | 12/2003 | Komsthoeft et al. |
| 6,664,986 B1 | 12/2003 | Kopelman et al. |
| 6,674,438 B1 | 1/2004 | Yamamoto et al. |
| 6,697,074 B2 | 2/2004 | Parikh et al. |
| 6,707,462 B1 | 3/2004 | Peercy et al. |
| 6,714,201 B1 | 3/2004 | Grinstein et al. |
| 6,714,221 B1 | 3/2004 | Christie et al. |
| 6,715,053 B1 | 3/2004 | Grigor |
| 6,717,599 B1 | 4/2004 | Olano |
| 6,724,403 B1 | 4/2004 | Santoro et al. |
| 6,734,864 B2 | 5/2004 | Abgrall |
| 6,738,804 B1 | 5/2004 | Lo |
| 6,741,242 B1 | 5/2004 | Itoh et al. |
| 6,742,042 B1 | 5/2004 | Holden et al. |
| 6,757,691 B1 | 6/2004 | Welsh et al. |
| 6,757,698 B2 | 6/2004 | McBride et al. |
| 6,760,046 B2 | 7/2004 | I'Anson et al. |
| 6,765,592 B1 | 7/2004 | Pletcher et al. |
| 6,788,318 B2 | 9/2004 | Chen |
| 6,792,616 B1 | 9/2004 | Jerding et al. |
| 6,806,892 B1 | 10/2004 | Plow et al. |
| 6,882,979 B1 | 4/2005 | Reay et al. |
| 6,892,360 B1 | 5/2005 | Pabla et al. |
| 6,906,720 B2 | 6/2005 | Emberling et al. |
| 6,910,000 B1 | 6/2005 | Yedidia et al. |
| 6,911,984 B2 | 6/2005 | Sabella et al. |
| 6,918,091 B2 | 7/2005 | Leavitt et al. |
| 6,931,633 B1 | 8/2005 | Vazquez et al. |
| 6,944,829 B2 | 9/2005 | Dando |
| 6,993,721 B2 | 1/2006 | Rosin et al. |
| 7,007,242 B2 | 2/2006 | Suomela et al. |
| 7,016,011 B2 | 3/2006 | De Haan |
| 7,024,381 B1 | 4/2006 | Hastings et al. |
| 7,027,055 B2 | 4/2006 | Anderson et al. |
| 7,028,264 B2 | 4/2006 | Santoro et al. |
| 7,036,083 B1 | 4/2006 | Zenith |
| 7,050,955 B1 | 5/2006 | Carmel et al. |
| 7,076,730 B1 | 7/2006 | Baker |
| 7,085,994 B2 | 8/2006 | Gvily |
| 7,107,546 B2 | 9/2006 | Coulthard |
| 7,127,473 B2 | 10/2006 | Agassi et al. |

(56) References Cited

U.S. PATENT DOCUMENTS

| | | | |
|---|---|---|---|
| 7,127,713 | B2 | 10/2006 | Davis et al. |
| 7,146,563 | B2 | 12/2006 | Hesmer et al. |
| 7,174,512 | B2 | 2/2007 | Martin et al. |
| 7,185,290 | B2 | 2/2007 | Cadiz et al. |
| 7,191,399 | B2 | 3/2007 | Ohtani et al. |
| 7,222,155 | B1 | 5/2007 | Gebhardt et al. |
| 7,242,406 | B2 | 7/2007 | Robotham et al. |
| 7,249,327 | B2 | 7/2007 | Nelson et al. |
| 7,260,380 | B2 | 8/2007 | Dietl et al. |
| 7,269,792 | B2 | 9/2007 | Consolatti et al. |
| 7,281,202 | B2 | 10/2007 | Croney et al. |
| 7,293,034 | B2 | 11/2007 | Paya et al. |
| 7,315,848 | B2 | 1/2008 | Pearse et al. |
| 7,328,435 | B2 | 2/2008 | Trifon |
| 7,426,687 | B1 * | 9/2008 | Schultz et al. ............. 715/208 |
| 7,478,326 | B2 * | 1/2009 | Holecek et al. ............. 715/716 |
| 7,490,295 | B2 | 2/2009 | Chaudhri et al. |
| 7,503,010 | B2 | 3/2009 | Chaudhri et al. |
| 7,530,026 | B2 | 5/2009 | Chaudhri et al. |
| 7,546,543 | B2 | 6/2009 | Louch et al. |
| 7,552,397 | B2 * | 6/2009 | Holecek et al. ............. 715/788 |
| 7,657,837 | B2 * | 2/2010 | Shappir et al. ............. 715/751 |
| 7,698,148 | B2 * | 4/2010 | Lavu et al. ............. 705/1.1 |
| 7,698,658 | B2 * | 4/2010 | Ohwa et al. ............. 715/835 |
| 7,730,082 | B2 | 6/2010 | Sah et al. |
| 7,761,800 | B2 | 7/2010 | Chaudhri et al. |
| 7,765,493 | B2 | 7/2010 | Chickles et al. |
| 7,793,222 | B2 | 9/2010 | Chaudhri et al. |
| 7,793,227 | B2 | 9/2010 | Wada et al. |
| 7,793,232 | B2 | 9/2010 | Chaudhri et al. |
| 7,802,246 | B1 | 9/2010 | Kennedy et al. |
| 7,873,908 | B1 | 1/2011 | Varanasi et al. |
| 7,873,910 | B2 | 1/2011 | Chaudhri et al. |
| 7,945,855 | B2 * | 5/2011 | Altman et al. ............. 715/244 |
| 2001/0030647 | A1 | 10/2001 | Sowizral et al. |
| 2001/0035885 | A1 | 11/2001 | Iron et al. |
| 2002/0013822 | A1 | 1/2002 | West |
| 2002/0049788 | A1 * | 4/2002 | Lipkin et al. ............. 707/513 |
| 2002/0054148 | A1 | 5/2002 | Okada |
| 2002/0059594 | A1 | 5/2002 | Rasmussen et al. |
| 2002/0065946 | A1 | 5/2002 | Narayan |
| 2002/0067418 | A1 | 6/2002 | I |
| 2002/0078453 | A1 | 6/2002 | Kuo |
| 2002/0085037 | A1 | 7/2002 | Leavitt et al. |
| 2002/0089526 | A1 | 7/2002 | Buxton et al. |
| 2002/0093516 | A1 | 7/2002 | Brunner et al. |
| 2002/0099678 | A1 | 7/2002 | Albright et al. |
| 2002/0105548 | A1 | 8/2002 | Hayton et al. |
| 2002/0112180 | A1 | 8/2002 | Land et al. |
| 2002/0114466 | A1 | 8/2002 | Tanaka et al. |
| 2002/0118217 | A1 | 8/2002 | Fujiki |
| 2002/0120673 | A1 | 8/2002 | Tolson et al. |
| 2002/0123739 | A1 | 9/2002 | Haacke et al. |
| 2002/0129092 | A1 | 9/2002 | Tolson et al. |
| 2002/0133508 | A1 | 9/2002 | LaRue et al. |
| 2002/0140740 | A1 | 10/2002 | Chen |
| 2002/0158902 | A1 | 10/2002 | Hooker et al. |
| 2002/0171682 | A1 | 11/2002 | Frank et al. |
| 2002/0174003 | A1 | 11/2002 | Redmann et al. |
| 2002/0174055 | A1 | 11/2002 | Dick et al. |
| 2002/0174181 | A1 | 11/2002 | Wei |
| 2002/0180798 | A1 | 12/2002 | Poor et al. |
| 2002/0186257 | A1 | 12/2002 | Cadiz et al. |
| 2002/0196268 | A1 | 12/2002 | Wolff et al. |
| 2003/0008661 | A1 | 1/2003 | Joyce et al. |
| 2003/0008711 | A1 | 1/2003 | Corbo |
| 2003/0009267 | A1 | 1/2003 | Dunsky et al. |
| 2003/0018971 | A1 | 1/2003 | McKenna, Jr. |
| 2003/0020671 | A1 | 1/2003 | Santoro et al. |
| 2003/0032409 | A1 | 2/2003 | Hutcheson et al. |
| 2003/0046316 | A1 | 3/2003 | Gergic et al. |
| 2003/0061482 | A1 | 3/2003 | Emmerichs |
| 2003/0067489 | A1 | 4/2003 | Candy Wong et al. |
| 2003/0069904 | A1 | 4/2003 | Hsu et al. |
| 2003/0076369 | A1 | 4/2003 | Resner et al. |
| 2003/0080995 | A1 | 5/2003 | Tenenbaum et al. |
| 2003/0097659 | A1 | 5/2003 | Goldman |
| 2003/0101046 | A1 | 5/2003 | Krasnov |
| 2003/0122787 | A1 | 7/2003 | Zimmerman et al. |
| 2003/0123739 | A1 | 7/2003 | Graffagnino |
| 2003/0146934 | A1 | 8/2003 | Bailey et al. |
| 2003/0154239 | A1 | 8/2003 | Davis et al. |
| 2003/0158975 | A1 | 8/2003 | Frank et al. |
| 2003/0164862 | A1 | 9/2003 | Cadiz et al. |
| 2003/0169306 | A1 | 9/2003 | Makipaa et al. |
| 2003/0174136 | A1 | 9/2003 | Emberling et al. |
| 2003/0174154 | A1 | 9/2003 | Yukie et al. |
| 2003/0184552 | A1 | 10/2003 | Chadha |
| 2003/0184584 | A1 | 10/2003 | Vachuska et al. |
| 2003/0189597 | A1 | 10/2003 | Anderson et al. |
| 2003/0191799 | A1 | 10/2003 | Araujo et al. |
| 2003/0206195 | A1 | 11/2003 | Matsa et al. |
| 2003/0208685 | A1 | 11/2003 | Abdel-Rahman |
| 2004/0003402 | A1 | 1/2004 | McKenna, Jr. |
| 2004/0012626 | A1 | 1/2004 | Brookins |
| 2004/0032409 | A1 | 2/2004 | Girard |
| 2004/0036711 | A1 | 2/2004 | Anderson |
| 2004/0039934 | A1 | 2/2004 | Land et al. |
| 2004/0070629 | A1 | 4/2004 | Seifert |
| 2004/0078814 | A1 | 4/2004 | Allen |
| 2004/0090969 | A1 | 5/2004 | Jerrard-Dunne et al. |
| 2004/0117831 | A1 | 6/2004 | Ellis et al. |
| 2004/0119754 | A1 | 6/2004 | Bangalore et al. |
| 2004/0125128 | A1 | 7/2004 | Chang et al. |
| 2004/0179019 | A1 | 9/2004 | Sabella et al. |
| 2004/0183800 | A1 | 9/2004 | Peterson |
| 2004/0194020 | A1 | 9/2004 | Beda et al. |
| 2004/0205504 | A1 | 10/2004 | Phillips |
| 2004/0212640 | A1 | 10/2004 | Mann et al. |
| 2004/0215740 | A1 | 10/2004 | Frank et al. |
| 2004/0223003 | A1 | 11/2004 | Heirich et al. |
| 2004/0225955 | A1 | 11/2004 | Ly |
| 2004/0230911 | A1 | 11/2004 | Bent et al. |
| 2004/0237082 | A1 | 11/2004 | Alcazar et al. |
| 2004/0255253 | A1 | 12/2004 | Marcjan |
| 2004/0261012 | A1 | 12/2004 | Balsiger |
| 2004/0261037 | A1 | 12/2004 | Ording et al. |
| 2004/0261038 | A1 | 12/2004 | Ording et al. |
| 2005/0010419 | A1 | 1/2005 | Pourhamid |
| 2005/0010634 | A1 | 1/2005 | Henderson et al. |
| 2005/0021935 | A1 | 1/2005 | Schillings et al. |
| 2005/0022139 | A1 | 1/2005 | Gettman et al. |
| 2005/0039144 | A1 | 2/2005 | Wada et al. |
| 2005/0057497 | A1 | 3/2005 | Kawahara |
| 2005/0060655 | A1 | 3/2005 | Gray et al. |
| 2005/0060661 | A1 | 3/2005 | Kawahara et al. |
| 2005/0088447 | A1 | 4/2005 | Hanggie et al. |
| 2005/0088452 | A1 | 4/2005 | Hanggie et al. |
| 2005/0091571 | A1 | 4/2005 | Leichtling |
| 2005/0091690 | A1 | 4/2005 | Delpuch et al. |
| 2005/0144563 | A1 | 6/2005 | Hough et al. |
| 2005/0144595 | A1 | 6/2005 | McLean |
| 2005/0149458 | A1 | 7/2005 | Eglen et al. |
| 2005/0160368 | A1 | 7/2005 | Liu et al. |
| 2005/0168471 | A1 | 8/2005 | Paquette |
| 2005/0168476 | A1 | 8/2005 | Levene et al. |
| 2005/0172239 | A1 | 8/2005 | Liu et al. |
| 2005/0183026 | A1 | 8/2005 | Amano et al. |
| 2005/0193368 | A1 | 9/2005 | Becker et al. |
| 2005/0198584 | A1 | 9/2005 | Matthews et al. |
| 2005/0215310 | A1 | 9/2005 | Boyd et al. |
| 2005/0221808 | A1 | 10/2005 | Karlsson et al. |
| 2005/0240857 | A1 | 10/2005 | Benedict et al. |
| 2005/0243373 | A1 | 11/2005 | Silverbrook et al. |
| 2005/0256940 | A1 | 11/2005 | Henderson et al. |
| 2005/0278651 | A1 | 12/2005 | Coe et al. |
| 2005/0282612 | A1 | 12/2005 | Mathews |
| 2005/0283734 | A1 | 12/2005 | Santoro et al. |
| 2006/0001652 | A1 | 1/2006 | Chiu et al. |
| 2006/0004913 | A1 | 1/2006 | Chong |
| 2006/0005207 | A1 | 1/2006 | Louch |
| 2006/0010394 | A1 | 1/2006 | Chaudhri et al. |
| 2006/0015818 | A1 | 1/2006 | Chaudhri et al. |
| 2006/0015846 | A1 | 1/2006 | Fraleigh et al. |

(56) References Cited

U.S. PATENT DOCUMENTS

| | | |
|---|---|---|
| 2006/0031264 A1 | 2/2006 | Bosworth et al. |
| 2006/0036703 A1 | 2/2006 | Fulmer et al. |
| 2006/0036941 A1 | 2/2006 | Neil |
| 2006/0036969 A1 | 2/2006 | Guido et al. |
| 2006/0053384 A1 | 3/2006 | La Fetra et al. |
| 2006/0064422 A1 | 3/2006 | Arthurs et al. |
| 2006/0075033 A1 | 4/2006 | Bienstock et al. |
| 2006/0075106 A1 | 4/2006 | Hochmuth et al. |
| 2006/0075141 A1 | 4/2006 | Boxenhorn |
| 2006/0089840 A1 | 4/2006 | May |
| 2006/0095331 A1 | 5/2006 | O'Malley et al. |
| 2006/0107231 A1 | 5/2006 | Matthews et al. |
| 2006/0112123 A1 | 5/2006 | Clark et al. |
| 2006/0123356 A1 | 6/2006 | Sobeski et al. |
| 2006/0123359 A1 | 6/2006 | Schatzberger et al. |
| 2006/0136843 A1 | 6/2006 | Shafron |
| 2006/0150118 A1 | 7/2006 | Chaudhri et al. |
| 2006/0156248 A1 | 7/2006 | Chaudhri et al. |
| 2006/0168536 A1 | 7/2006 | Portmann |
| 2006/0168538 A1 | 7/2006 | Stevens et al. |
| 2006/0174202 A1 | 8/2006 | Bonner |
| 2006/0197752 A1 | 9/2006 | Hurst et al. |
| 2006/0206835 A1 | 9/2006 | Chaudhri et al. |
| 2006/0218499 A1 | 9/2006 | Matthews et al. |
| 2006/0230059 A1 | 10/2006 | Etgen et al. |
| 2006/0230272 A1 | 10/2006 | Lawrence et al. |
| 2006/0236257 A1 | 10/2006 | Othmer et al. |
| 2006/0253794 A1 | 11/2006 | Wilson |
| 2006/0271637 A1 | 11/2006 | McKeon et al. |
| 2006/0274086 A1 | 12/2006 | Forstall et al. |
| 2006/0277469 A1 | 12/2006 | Chaudhri et al. |
| 2006/0277481 A1 | 12/2006 | Forstall et al. |
| 2007/0011026 A1 | 1/2007 | Higgins et al. |
| 2007/0038934 A1 | 2/2007 | Fellman |
| 2007/0044029 A1 | 2/2007 | Fisher et al. |
| 2007/0044039 A1 | 2/2007 | Amadio et al. |
| 2007/0061724 A1 | 3/2007 | Slothouber et al. |
| 2007/0074126 A1 | 3/2007 | Fisher et al. |
| 2007/0101146 A1 | 5/2007 | Louch et al. |
| 2007/0101279 A1 | 5/2007 | Chaudhri et al. |
| 2007/0101288 A1 | 5/2007 | Forstall et al. |
| 2007/0101291 A1* | 5/2007 | Forstall et al. ............... 715/805 |
| 2007/0101297 A1 | 5/2007 | Forstall et al. |
| 2007/0101433 A1 | 5/2007 | Forstall et al. |
| 2007/0112739 A1 | 5/2007 | Burns et al. |
| 2007/0118813 A1 | 5/2007 | Forstall et al. |
| 2007/0129888 A1 | 6/2007 | Rosenberg |
| 2007/0130523 A1 | 6/2007 | Ku et al. |
| 2007/0130541 A1 | 6/2007 | Louch et al. |
| 2007/0157119 A1 | 7/2007 | Bishop |
| 2007/0162850 A1 | 7/2007 | Adler et al. |
| 2007/0198946 A1 | 8/2007 | Viji et al. |
| 2007/0203984 A2 | 8/2007 | AlHusseini et al. |
| 2007/0209013 A1 | 9/2007 | Ramsey et al. |
| 2007/0233736 A1 | 10/2007 | Xiong et al. |
| 2007/0266093 A1 | 11/2007 | Forstall et al. |
| 2007/0273558 A1* | 11/2007 | Smith et al. ............... 340/995.1 |
| 2007/0300185 A1 | 12/2007 | Macbeth et al. |
| 2007/0300225 A1 | 12/2007 | Macbeth et al. |
| 2008/0016468 A1 | 1/2008 | Chambers et al. |
| 2008/0034309 A1* | 2/2008 | Louch et al. ............... 715/766 |
| 2008/0034314 A1 | 2/2008 | Louch et al. |
| 2008/0040681 A1* | 2/2008 | Synstelien et al. ............ 715/765 |
| 2008/0052348 A1 | 2/2008 | Adler et al. |
| 2008/0097906 A1 | 4/2008 | Williams et al. |
| 2008/0120658 A1* | 5/2008 | Cubillo ............... 725/91 |
| 2008/0155453 A1 | 6/2008 | Othmer |
| 2008/0168367 A1 | 7/2008 | Chaudhri et al. |
| 2008/0168368 A1 | 7/2008 | Louch et al. |
| 2008/0168382 A1 | 7/2008 | Louch et al. |
| 2008/0235602 A1 | 9/2008 | Strauss et al. |
| 2009/0005071 A1 | 1/2009 | Forstall et al. |
| 2009/0021486 A1 | 1/2009 | Chaudhri et al. |
| 2009/0024943 A1 | 1/2009 | Adler et al. |
| 2009/0024944 A1 | 1/2009 | Louch et al. |
| 2009/0125815 A1 | 5/2009 | Chaudhri et al. |
| 2009/0144644 A1 | 6/2009 | Chaudhri et al. |
| 2009/0158193 A1 | 6/2009 | Chaudhri et al. |
| 2009/0187841 A1 | 7/2009 | Chaudhri et al. |
| 2009/0228824 A1 | 9/2009 | Forstall et al. |
| 2009/0260022 A1 | 10/2009 | Louch et al. |
| 2009/0271724 A1 | 10/2009 | Chaudhri et al. |
| 2010/0138295 A1 | 6/2010 | Caron et al. |

FOREIGN PATENT DOCUMENTS

| | | |
|---|---|---|
| EP | 0694879 | 1/1996 |
| EP | 1 237 076 | 9/2002 |
| EP | 1383080 | 1/2004 |
| EP | 0972273 | 3/2004 |
| EP | 1 724 996 | 11/2006 |
| WO | WO 96/06401 | 2/1996 |
| WO | WO 97/07467 | 2/1997 |
| WO | WO 98/07112 | 2/1998 |
| WO | WO 98/45815 | 10/1998 |
| WO | WO 02/09039 | 1/2002 |
| WO | WO 03/023593 | 3/2003 |
| WO | WO 2004/027707 | 4/2004 |
| WO | WO 2004/076977 | 9/2004 |
| WO | WO 2006/012343 | 2/2006 |
| WO | WO 2006/020304 | 2/2006 |
| WO | WO 2006/119269 | 11/2006 |
| WO | WO 2009/012319 | 12/2009 |
| WO | WO 2009/012330 | 12/2009 |

OTHER PUBLICATIONS

International Search Report and Written Opinion, dated Oct. 16, 2009, in International Application No. PCT/US2008/070217.

Caceres et al., "Widget 1.0 Requirements", [Online] [Downloaded on Sep. 10, 2009]; Retrieved from the Internet at URL: http://www.w3.org/TR/2007/WD-widgets-reqs-20070705; 30 pages.

Beier, et al., "The bull's-eye: a framework for web application user interface design guidelines", Proceedings of the Sigchi Conference on Human Factors in Computing Systems, Apr. 2003, pp. 489-496.

Carey, et al., "Integrating Widget Design Knowledge with User Interface Toolkits", Proceedings of the Fifth International Workshop on Computer-Aided Software Engineering, Jul. 1992, pp. 204-212.

Louch et al., "Multidimensional Widgets", U.S. Appl. No. 12/612,301, filed Nov. 4, 2009.

Warren, "The VMware Workstation 5 Handbook", Jun. 2005, Course Technology PTR, 50 pages.

Bauer, "Transparent User Modeling for a Mobile Personal Assistant," LWA 2004: Lemen-Wissensentdecking-Adaptivitat, [Online] Oct. 6, 2004, pp. 3-8, Berlin Retrieved from the Internet: URL:http://www.dfki.de/specter/Docs/Bauer04.pdf [retrieved on Sep. 15, 2009].

Widget Test Ground, Dec. 1, 2005, 5 pages.

tellWidget, Sep. 5, 2005, 3 pages.

Widget Creation Tutorial, Oct. 30, 2005, 25 pages.

Bauer and Deru, "Motion-Based Adaptation of Information Services for Mobile Users," Lecture Notes in Computer Science, Aug. 19, 2005, Retrieved from the Internet, URL: http://www.springerlink.com/content/lwdvxw9ervxa44f9/fulltext.pdf>, [retrieved on Sep. 15, 2009], 6 pages.

Lieberman and Selker, "Agents for the User Interface," Handbook of Agent Technology, 2003, pp. 1-20, Retrieved from the Internet, URL: http://web.media.mit.edu/{lieber/Publications/Agents_for_UI.pdf> [retrieved on Sep. 15, 2009].

Javaboutique. Oct. 8, 2008. Available at: http://web.archive.org/web/20021208051951/http://javaboutique.internet.com/utilities/counter.html (may be duplicate of earlier javaboutique reference).

eHow, VMWare, http://www.ehow.com/how_6368_minimize-window.html, "How to Minimize a Window," Jun. 2004.

Grundy, "An environment for developing adaptive, multi-device user interfaces," AUIC '03 Proceedings of the Fourth Australasian User Interface Conference on User Interfaces, 2003, vol. 18, Australian Computer Society, Inc., Darlinghurst, Australia.

"About Merkitys"; [online] [Retrieved on Feb. 4, 2008]; Retrieved from the Internet, URL: http://meaning.3xi.org/; 3 pages.

(56) References Cited

OTHER PUBLICATIONS

"Advanced Digital Photo Solutions"; GeoSpatial Experts; [online] [Retrieved on Feb. 4, 2008]; Retrieved from the Internet, URL: http://www.geospatialexperts.com/productadv.html; 4 pages.

"Comarison of widget engines", http://en.wikipedia.org/wiki/Comparison_of_widget_engines, 2007, 6 pages.

"Coolsmartphone"; [online] [Retrieved on Apr. 13, 2006]; Retrieved from the Internet, URL: http://www.coolsmartphone.com/article569.html; 57 pages.

"Dashboard Blog", Dec. 2003, Retrieved from the Internet on May 11, 2007 <URL:http://www.nat.org/dashboard/blog.php3> 31pages.

"Garmin hits iphone directly with nuvifone"; [online] [Retrieved on Mar. 17, 2008]; Retrieved from the Internet, URL: http://www.electronista.com/print/50764; 3 pages.

"Garmin® nüvifone™ Takes Personal Navigation and Communication to the Next Level"; Garmin International; [online] [Retrieved on Mar. 17, 2008]; Retrieved from the Internet, URL: http://www8.garmin.com/pressroom/mobile/013008.html; 3 pages.

"Go View Map Save to Favorites Cancel"; [online] [Retrieved on Feb. 4, 2008]; Retrieved from the Internet, URL: http://www8.garmin.com/buzz/nuvifone/m/g/sc-geotag-lg.jpg; 1 page.

"GPS Blogging Phones"; [online] [Retrieved on Apr. 5, 2006] Retrieve from the Internet, URL: http://www.dailywireless.org/modules.php?name=News&file=article&sid=4613; 3 pages.

"International Roaming Guide—Personal Experience(s) from Customer and Community Member"; [online] [Retrieved Jun. 26, 2006] Retrieved from the Internet <URL: http://forums.cingular.com/cng/board/message?board.id=1185; 6 pages.

"MOREnet Dialing Plan: PSTN and IP Network Integration for H.323, H320 VoIP and Public Voice Networks", [online] [Retrieved on Jan. 11, 2008] Retrieved from the Interent < URL: http://www.more.net/technical/research/dialplan/index.html, 12 pages.

"New Improved Panoramio—Geo Photo Sharing"; Google Earth Blog; [online] [Retrieved on Feb. 5, 2008]; Retrieved from the Internet, URL: http://www.gearthblog.com/blog/archives/2006/06/new_improved_pa.html, 1 page.

"SNAP, MAP and SHARE Your World"; IsWhere by Red Hen Systems; [online] [Retrieved on Jun. 3, 2008]; Retrieved from the Internet, URL: http://www.redhensystems.com/products/multimedia_mapping_software/iswhere/default.asp?sm=2; 1 page.

"Windows Sidebar", Wikipedia, Retrieved from the Internet, <URL:http://en.wikipedia.org/wiki/Windows-Sidebar>, 2007, 7 pages.

"Convert just about Anything to Anything else", OnlineConversion.com, Aug. 2000, [online] [Retrieved on Jun. 22, 2008] Retrieved from the Internet, URL:http://web.archive.org/web/200000815055422/http://www.onlineconversion.com>.

"Writing a Desk Accessory," Developer Connection, Apple Computer, Inc. Jul. 3, 1996, [online] [Retrieved on Jan. 3, 2006] Retrieved from the Internet URL: http://developer.apple.com/documentation/mac/devices/devices-16.html>, 3 pages.

Akeley, Kurt, and Hanrahan, Pat, "Real-Time Graphics Architecture," http://www.grahics.stanford.edu/courses/cs448a-01-fall, the OpenGL Graphics System, CS448 Lecture 15, Fall, 2001, pp. 1-20.

Altman, R.B., "Visual Quickstart Guide Power Point 2000/98, Applying Preset Animations," ProQuest Safari Books, Peachpit Press, May 7, 1999, 7 pages [online] Retrieved from the Internet: <URL: http://proquest.safaribooksonline.com/0201354411>.

Archive of "Objects, Images and Applets," W3C Recommendation, Feb. 10, 2003, [online] [Archived by http://archivve.org; Retrieved on Apr. 13, 2006] Retrieved from the Internet URL:http://web.archivve.org/web/20030210154019/http://www.w3.org/TR/REC-html140/struct/objects.html, 21 pages.

Beier et al., "The bull's-eye: a framework for web application user interface design guidelines", Proceedings of the Sigchi Conference on Human Factors in Computing Systems, Apr. 2003, pp. 489-496.

Cadiz, JJ et al., "Slideshow: Providing Peripheral Awareness of Important Information," Technical Report MSR-TR-2001-83, (Sep. 14, 2001), 9 pages. Microsoft Corporation, Redmond, WA.

Carey et al., "Integrating Widget Design Knowledge with User Interface Toolkits", Proceedings of the Fifth International Workshop on Computer-Aided Software Engineering, Jul. 1992, pp. 204-212.

Chen et al., "The Model of Optimum Route Selection in Vehicle Automatic Navigation System Based on Unblocked Reliability Analyses", Intelligent Transportation Systems, 2003, Proceedings, IEEE (2003), vol. 2, Oct. 12-15, 2003, pp. 975-978.

Chinese Notification of First Office Action, Chinese Patent Application No. 200580016349.3, Jul. 25, 2008, 21 pages.

Conner et al. "Three-Dimensional Widgets" ACM 1992, pp. 183-231.

Elliott, Conal, "Programming Graphics Processors Functionally," Proceedings of the 2004 Haskell Workshop, Sep. 22, 2004. 11 pages.

Fried, Ina, "Developer Calls Apple's Tiger a Copycat," CNET News.com, Jun. 28, 2004 [online] Retrieved on Jul. 1, 2004] Retrieved from the Internet URL:http://zdnet.com.com/2102-1104_2-250692.html?tag=printthis, 2 pages.

Fried, Ina, "For Apple's Tiger, the Keyword is Search", CNET News.com, Jun. 28, 2004 [online] Retrieved on Jul. 1, 2004] Retrieved from the Internet URL:http://zdnet.com.com/2102-1103_2-5250346.html?tag=printthis, 2 pages.

Guber, John et al., "Dashboard vs. Konfabulator", Jun. 2004, 9 pages.

Haeberli, P. et al., "The Accumulation Buffer: Hardware Support for High-Quality Rendering," Computer Graphics, Aug. 1990, pp. 309-318, vol. 24, No. 4.

Han; "Bi-manual, multi-point, and multi-user interactions on a graphical interaction surface"; Mutli-Touch Interaction Research; [online] [Retrieved on Apr. 13, 2006]; Retrieved from the Internet, URL: http://mrl.nyu.edu/~jhan/ftirtouch/; 4 pages.

Helal et al., "Drishti: An Integrated Navigation System for Visually Impaired and Disabled", Fifth International Symposium on Wearable Computers (ISWC'01), IEEE, 2001, pp. 149-156.

International Search Report, PCT/US2005/008804, Jul. 27, 2005, 3 pages.

International Search Report and Writen Opinion, PCT/US2005/022152, Jul. 10, 2006, 8 pages.

International Search report, PCT/US2005/008805, Aug. 8, 2005, 3 pages.

Invitation to Pay Additional Fees(Form PCT/ISA/206) and Communication Relating to the Results of the Partial Intrenational Search (PCT/ISA/206 (Annex)) for PCT/US2007/077441; dated Jan. 28, 2008, 8 pages.

Invitation to Pay Additional Fees(Form PCT/ISA/206) and Communication Relating to the Results of the Partial Intrenational Search (PCT/ISA/206 (Annex)) for PCT/US2008/050295; dated Jul. 29, 2008.

Konfabulator, "Cupertino, Start your Photocopiers!," [online] [Retrieved on Jul. 1, 2004] Retrieved from the Internet <URL: http://www.konfabulator.com>, 1 page.

Konfabulator, "Konfabulator & Widget Basics," [online] [Retrieved on Jul. 1, 2004] Retrieved from the Internet <URL: http://www.konfabulator.com/info/basics.html>, 3 pages.

Konfabulator, "Screenshots," [online] [Retrieved on Jul. 1, 2004] Retrieved from the Internet <URL: http://www.konfabulator.com/info/screenshots.html>, 2 pages.

Konfabulator, "What is Konfabulator?," [online] [Retrieved on Jul. 1, 2004] Retrieved from the Internet <URL: http://www.konfabulator.com/info/, 3 pages.

Lammers, J.., et al., "Maya 4.5 Fundamentals: Particles, "New Riders Publishing, Jan. 14, 2003, 12 pages, [online] [retrieved on Feb. 17, 2007] Retrieved from ProQuest Safari Books Online on the Internet: <URL: http://proquest.safaribooksonline.com/0735713278>, 12 pages.

Microsoft Corporation, "Microsoft® Windows™ Graphical Environment User's Guide", Version 3.0 for MS-DOS® or PC-DOS Operating System, 1990, Document No. SY06851-0290, pp. Cover-vii, 15-75, 315-353.

Microsoft Corporation, "User's Guide Microsoft® Windows™ and MS-DOS® 6", 1993, pp. Cover-xvi, 112-121.

Notification of Transmittal of the International Search Report and the Written Opinion of the International Searching Authority, PCT/US2005/022579, 15 pages.

(56) References Cited

OTHER PUBLICATIONS

Notification of Transmittal of the International Search Report and the Written Opinion of the International Searching Authority, PCT/US2007/077441, May 8, 2008; 17 pages.
Nvidia, "CG—Teaching Cg," Power Point Presentation, Author and date unknown, pp. 1-16.
Puder, A., "Extending Desktop Applications to the Web," ACM International Conference Proceedings Series, Proceedings of the Jun. 2004 International Symposium on Information and Communication Technologies, 2004, vol. 90, 6 pages.
Rist et al., "Customizing Graphics for Tiny Displays of Mobile Devices", Personal and Ubiquitous Computing, 2002, pp. 260-268, vol. 6.
Rochkind, M. et al., "Common Elements in Today's Graphical User Interfaces: The Good, the Bad, and the Ugly," Interchi '93, AMC, Apr. 24-29, 1993, pp. 470-473.
Segal, Mark and Akeley, Kurt, "The OpenGL Graphics System: A Specification (Version 1.5)," Copyright 1992-2003 Silicon Graphics, Inc., Oct. 30, 2003, 334 pages.
Shantzis, Michael A., "A Model for Efficient and Flexible Image Computing," Computer Graphics Proceedings, Annual Conference Series, Orlando, Florida, Jul. 24-29, 1994, pp. 147-154.
Shiozawa, Hidekazu et al., "Perspective Layered Visualization of Collaborative Workspaces," Proceedings of the International ACM SIGGROUP conference on Supporting Group Work Publisher, Nov. 1999, 5 pages.
Snippet Software, "Product Spotlight Non-browser based portal solution from Snippets Software", Corporate Portal Newsletter, Oct. 2000, vol. 1, No. 10, 3 pages.
Snippet Software, "Snippets Software Platform", Retrieved from the Internet on Jun. 11, 2001 <URL:http://www.snippets.com/products/>.
Snippets Software et al., "Products Overview", Feb. 2002, [online] [Retrieved on Feb. 5, 2008] Retrieved from the Internet URL: http://web.archive.org/web/20020206061508/http://www.snippets.com/products/>.
Staples, Loretta, "Representation in Virtual Space: Visual Convention in the Graphical User Interface," Proceedings of the SIGCHI Conference on Human Factors in Computing Systems, Apr. 1993. http://www.nat.org/dashboard/blog.php3 Dec. 2003, 8 pages.
Stardock et al., "DesktopX General Guide," Aug. 2000, [online] [Retrieved on Jan. 31, 2008] Retrieved from the Internet URL:http://www.stardock.com/products/desktopx/docs/.
Stardock et al., "DesktopX Tutorial", Aug. 2000, [online] [Retrieved on Jan. 31, 2008] Retrieved from the Internet URL:http://www.stardock.com/products/desktopx/tutorial.html.
Stardock et al., "DesktopX WhitePaper", Aug. 2000, [online] [Retrieved on Jan. 31, 2008] Retrieved from the Internet <URL:http://www.stardock.net/media/whitepaper_desktopx.html.
Stardock et al., "The User Guide—Version 2", DesktopX 2000.
Stardock et al., "What Can It Do? Making Objects", DesktopX Tutorial, 2001, [online] [Retrieved on Apr. 11, 2008] Retrieved from the Internet URL:http://web.archive.org/web/2001101922285/http://www.stardock.com/products/desktopx/ . . . .
Stardock News, DesktopX User Manual On-line:, 1999, 2003 [online] [Retrieved from the Internet on May 11, 2007] <URL:http://www.stardock.comnewsitem.asp?id=538>.
Stardock News/Media/Press.
Stardock, "DesktopX Whitepaper and users Guide" Retrived from the Internet <URL:http://www.stardock.net/media/whitepaper_desktopx.html>, 1999, 72 pages.
Tang, J.C. et al., "ConNextto Awarenex: Extending Awareness to Mobile Users," SIGCHI '01, AMC, Mar. 31-Apr. 4, 2001, 8 pages.
Ullenboom, C., "Java is auch eine Insel," 2003, [online] [Retrieved on Apr. 13, 2006] Retrieved from the Internet URL: http://www.galileocomputing.de/openbook/javainse12//java_140000.htm#Xxx998138, 3 pages.
Van Gelder, Allen, and Kwansik, Kim, "Direct Volume Rendering with Shading via Three-Dimensional Textures," Computer Science Dept., Univ. of California, Santa Cruz, CA 95064, 9 pages.
Wardell, "Konfabulator for Windows", Jan. 10, 2004, Retrieved from the Internet on Mar. 6, 2006, URL: http://www.xpthemes.com/forums.aps?MID=19&CMID=19&AID=4472, 6 pages.
Partial Interntional Search Rpeort, dated May 15, 2009, issued in Interntional Application No. PCT/US2008/050047.
Invitation to Pay fees and Partial International Search Report, dated May 8, 2009, issued in PCT/US2008/050038.
Archive of BabelFish.com Inc., Oct. 2003, [online] [Archived by http://archive.org on Oct. 2, 2003; retrieved on Dec. 8, 2008] Retrieved from the Internet URL: <http://web.archive.org/web/20031002115902/www.babelfish.com/en/index.html>.
Starfish Software Introduces Starfish Internet Sidekick; Starfish Internet Sidekick is the best way for Internet users to manage their calendar, contacts and communications, Busienss Wire, Sep. 23, 1996, [online] [Retrieved on Dec. 8, 2008] Retrieved from the Internet URL: <http://findarticles.com/articles/mi_mOEIN/is_1996_Sept_23/ai_18704672?tag=rel.resl>.
Archive of www.gigaplex.com, Lazar Productions, Nov. 1996, [online] [Archieved by http://archive.org on Nov. 5, 1996; retrieved on Dec. 8, 2008] Retrieved from the Internet URL: <http://web.archive.org/web/19961105081827/www.gigaplex.com/>.
Archive of movies.com, Jan. 2002, [online] [Archived by http://archive.org on Janaury 18, 2002; Retrieved on Dec. 8, 2008] Retrieved from the Internet URL: <http://www.archive.org/web/20020118102516/movies.go.com>.
Baratz et al., "DesktopX 3/1", Ars Technica, Nov. 17, 2005, [online] [Retrieved on Aug. 1, 2008] Retrieved from the Internet URL: <http://arstechnica.com/reviews/apps/desktopx/ars.>.
Siracusa et al., "Mac OA 10.4 Tiger: Dashboard", Apr. 28, 2005, [online] [Retrieved on Aug. 1, 2008] Retrieved from the Internet URL: <http://arstechnica.com/reviews/os/macosz-10-4.ars/17>.
Wardell et al. "Apple's Dashboard vs. Konfabulator vs. DesktopX", Skinning the frog, Jul. 1, 2004, [online] [Retrieved on Aug. 1, 2008] Retrieved from the Internet URL: <http://frogboy.joeuser.com/article/19800>.
Thomas et al., "Animating Widgets in the InterViews Toolkit", Lecture Notes in Computer Science, pp. 26-44, 1995.
VMWare, "VMWare Workstation User's Manual", 2002, pp. 12-13.
JavaBoutique, Oct. 1, 2002. Available at: <http://javaboutique.internet.com/utilities/counter.html>.
Forstall, et al. U.S. Appl. No. 12/469,555, filed May 20, 2009.
"Coolsmartphone"; Apr. 17, 2006, [online] [Retrieved on Sep. 11, 2009]; Retrieved from the Internet, URL: http://www.web.archive.org/web/20060417080115/http://www.coolsmartphone.com/article569.html ; 24 pages.
"Desktop Sidebar", [online] [Retrieved on May 11, 2007] Retrieved from the Internet URL: http://web.archive.org/web/20040101160831/http://www.desktopsidebar.com/; 5 pages.
Garmin® nüvifone™ Images, [online] [Retrieved from the Internet on Feb. 4, 2008], URL: http://www8.garmin.com/buzz/nuvifone/media_gallery.jsp; 2 pages.
"Inter-widget communication?", [online] [Retrieved on Jun. 5, 2009], Retrieved from the Internet URL: http://www2.konfabulator.com/forums/lofiversion/index.php/t125.html; 3 pages.
"Portlet Communication: What is application scope, anyway?", Sep. 18, 2002, [online]; Retrieved from the Internet at URL: http://wwwcoderanch.com/t/203244/PortalsPortlets/java/Portlet-Communication-What-application-scope; 3 pages.
"Portlet-to-portlet communication between JSR 168 portlets on public pages", Apr. 5, 2006, [online]; Retrieved from the Internet URL: http://www.ibm.developerworks/websphere/library/techarticles/0604_scott/0604_scott.html; 9 pages.
Akeley, "Cg—Teaching Cg," Power Point Presentation, NVIDIA Corporation, 2002; 1 page.
International Search Report and Written Opinion, dated Sep. 3, 2009, issued in International Application No. PCT/US2008/050047; 17 pages.
Konfabulator, "Konfabulator & Widget Basics—A Refresher Course in Widgetology", [online] [Retrieved on Jun. 5, 2009], Retrieved from the Internet URL: http://web.archive.org/web/20050811020610/http://konfabulator.com/basics; 16 pages.
Stardock, "Gallactica Civilization: Dread Lords—User Manual", Stardock Entertainment © 2006; 65 pages.

(56) References Cited

OTHER PUBLICATIONS

Stardock, "Your Edge in Software", [online] [Retrieved on May 11, 2007]; Retrieved from the Internet URL: http://www.stardock.com/media.asp?cmd=mediakits; 56 pages.

Van Gelder et al., "Direct Volume Rendering with Shading via Three-Dimensional Textures," Computer Science Dept., Univ. of California, Santa Cruz, CA 95064, Jul. 19, 1996; 17 pages.

Conner Borookshire D. et al. "Three-Dimensional Widgets" ACM 1992, 8 pages.

Fried, Ina, "Developer Calls Apple's Tiger a Copycat," CNET News.com, Jun. 28, 2004 [online] Retrieved on Jul. 1, 2004] Retrieved from the Internet URL:http://zdnet.com.com/2102-11-4_2-250692.html?tag=printthis, 2 pages.

Http://en.wikipedia.org/wiki/Comparison_of_widget_engines, 2007, 6 pages.

http://en.wikipedia.org/wiki/Windows-Sidebar, 2007, 7 pages.

http://www.nat.org/dashboard/blog.php3_Dec. 2003, 31 pages.

International Search Report, PCT/US2005/008804, Jul. 27, 2005, 3 pages.

International Search Report and Writen Opinion, PCTTUS2005/022152, Jul. 10, 2006, 8 pages.

Konfabulator, "Konfabulator & Widget Basics," [online] [Retrieved on Jul. 1, 2004] Retrieved from the Internet <URL:http://www.konfabulator.com/info/basics.html>, 3 pages.

Snippet Software Inc. et al. "Corporate Portal Newsletter" Oct. 2000, 3 pages.

Snippet Software Inc. et al. "Snippets Software" Jun. 2001, 16 pages.

Stardock.com et al. "DesktopX Whitepaper and users Guide" 1999, 72 pages.

Tang, J.C. et al., "ConNexus to Awarenex: Extending Awareness to Mobile Users," SIGCHI '01, AMC, Mar. 31-Apr. 4, 2001, 8 pages.

Wardell, Brad, Konfabulator for Windows, Jan. 10, 2004; [online] Retrieved from the Internet Mar. 6, 2006] Retrieved from the Internet: URL: http://www.xpthemes.com/forums.asp?MID=19&CMID=19&AID=4472, 6 pages.

Rodriguez et al., "IBM WebSphere Portal V5 a Guide for Portlet Application Development," Feb. 1, 2004, 48 pages.

Inter-Widget Messaging!, I want my widgets to work together !, Feb. 7, 2005, 4 pages.

Widget to widget communication, Jun. 29, 2006, 2 pages.

Widgets 1.0, Nov. 9, 2006, 13 pages.

* cited by examiner

WEB WIDGETS

TECHNICAL FIELD

The disclosed implementations are generally related to media authoring tools and user interfaces.

BACKGROUND

Website creation tools targeted to the consumer market allow end users to create websites and other types of media (e.g., blogs, podcasts, multimedia presentations, slide shows) with little or no knowledge of web languages. One popular website creation tool is iWeb®, developed by Apple Inc. (Cupertino, Calif.). Users of website creation tools often desire to have a large selection of interesting page elements (e.g., text, images, video, animation) to choose from when creating a website. Some of these elements, however, can be tedious or time consuming to create and/or may require the user to have extensive knowledge of expert features provided by the tool. Some website creation tools require the user to exit the tool or interact with a different user interface of the tool to accomplish certain tasks, such as interacting with third party web services (e.g., map services, advertising services) or searching directories and files for content (e.g., digital photos) to be included in the website.

SUMMARY

A media authoring tool includes web widgets for creating page elements for various types of media (e.g., websites, blogs, broadcasts, slide shows, multimedia presentations). A widget inspector associated with the widget can be used to modify the behaviour of the widget.

In some implementations, a method includes: generating a page for presentation in a user interface of a media authoring tool; generating a widget and an associated widget inspector; presenting the page and the widget inspector in the user interface; presenting the widget on the page; obtaining a user input through the widget inspector; and automatically modifying a behavior of the widget based on the user input.

In some implementations, a method includes: generating a page for presentation in a user interface of a media authoring tool; obtaining a user input specifying a content source; generating a widget for displaying content from the content source, the widget including a navigation control; presenting the page and the widget in the user interface; presenting first content through the widget; obtaining navigation control input; and presenting second content through the widget based on the navigation control input.

Other implementations are disclosed that are directed to systems, methods and computer-readable mediums.

DETAILED DESCRIPTION

Web Widget Overview

Figure 1:
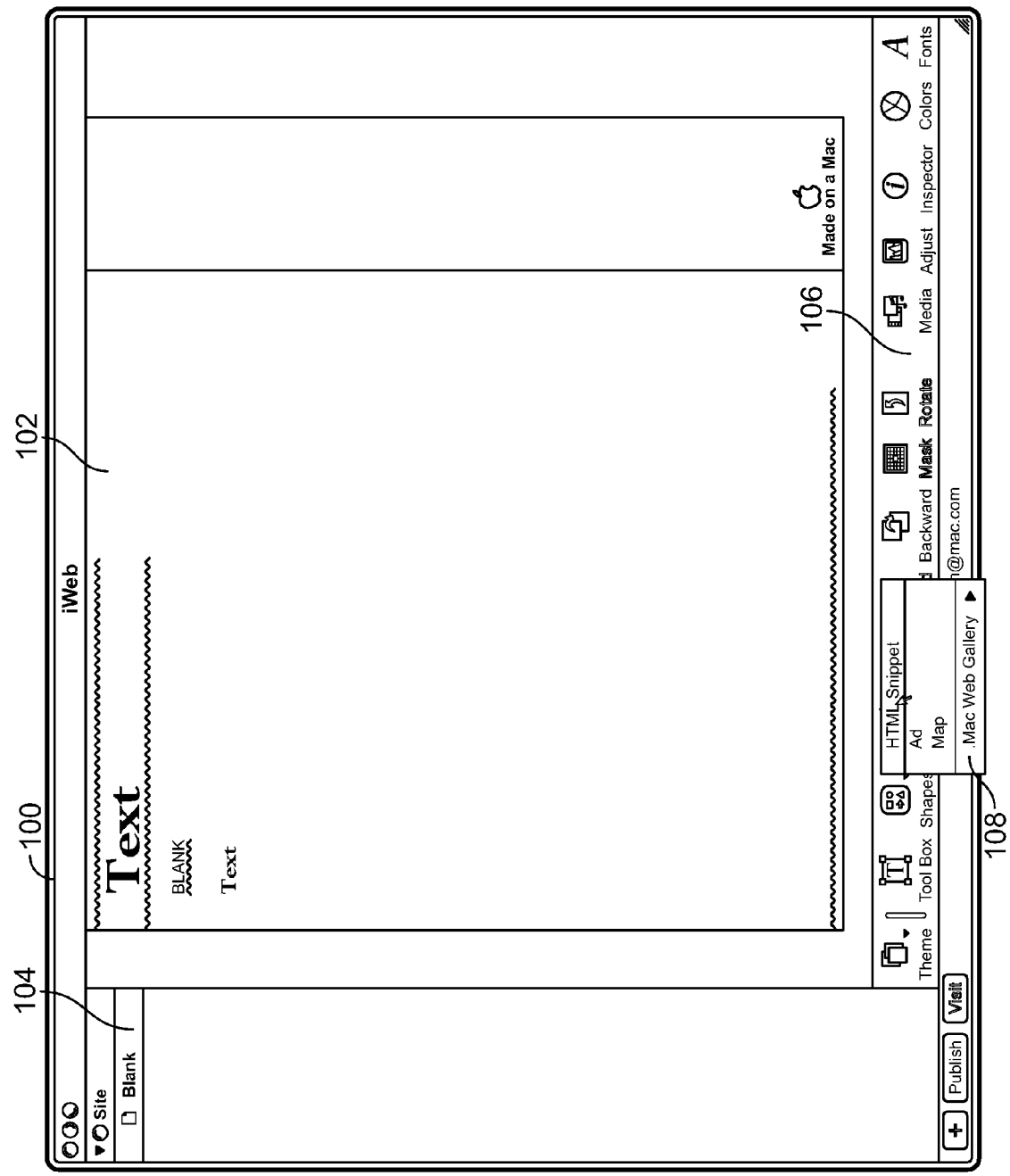
FIG. 1 is a screen shot of an example user interface for a media authoring tool.

FIG. 1 is a screen shot of an example user interface 100 for a media authoring tool. The media authoring tool can be used to create various media, including but not limited to: websites, blogs, multimedia presentations, slide shows, media broadcasts (e.g., podcasts, videocasts), interactive learning materials, animations, etc. In the examples that follow, references are made to screen shots for iWeb® website creation tool. The disclosed implementations, however, are equally applicable to other media authoring tools, including markup language editors (e.g., HTML or XHTML editors).

Referring to FIG. 1, a user has selected a "blank" page 102 from a menu 104 in the user interface 100 of the media authoring tool. In some implementations, the user can select a page template from a list of page templates. The page templates can be associated with themes. A page template can include a professional looking layout of various page elements (e.g., text boxes, shapes, web widgets) having various properties or attributes (e.g., font, size, location, orientation, color, opacity, texture, shape, shadows, animation) that the user can manipulate and customize through the user interface 100. With some media authoring tools (e.g., iWeb®), a website created by a user can be automatically published to the Internet, where the website can be viewed by anyone with a web browser.

In some implementations, the user interface 100 can include a tool bar 106 for allowing the user to select various editing tools for creating and modifying elements on the webpage 102. Some examples of tools include a "text box" tool for creating text boxes, a "shapes" tool for adding shapes and a "web widget" tool for invoking web widgets.

A "web widget" functions like an application in the media authoring tool. Web widgets can be built using various web technologies including, for example, a markup language (e.g., HTML, XHTML), Cascading Style Sheets (CSS), JavaScript®, etc. Web widgets can have their own user interfaces and controls for assisting the user in creating various page elements. A web widget can differentiate whether it is running in a media authoring tool or in a browser (e.g., Safari®).

Figure 2A:
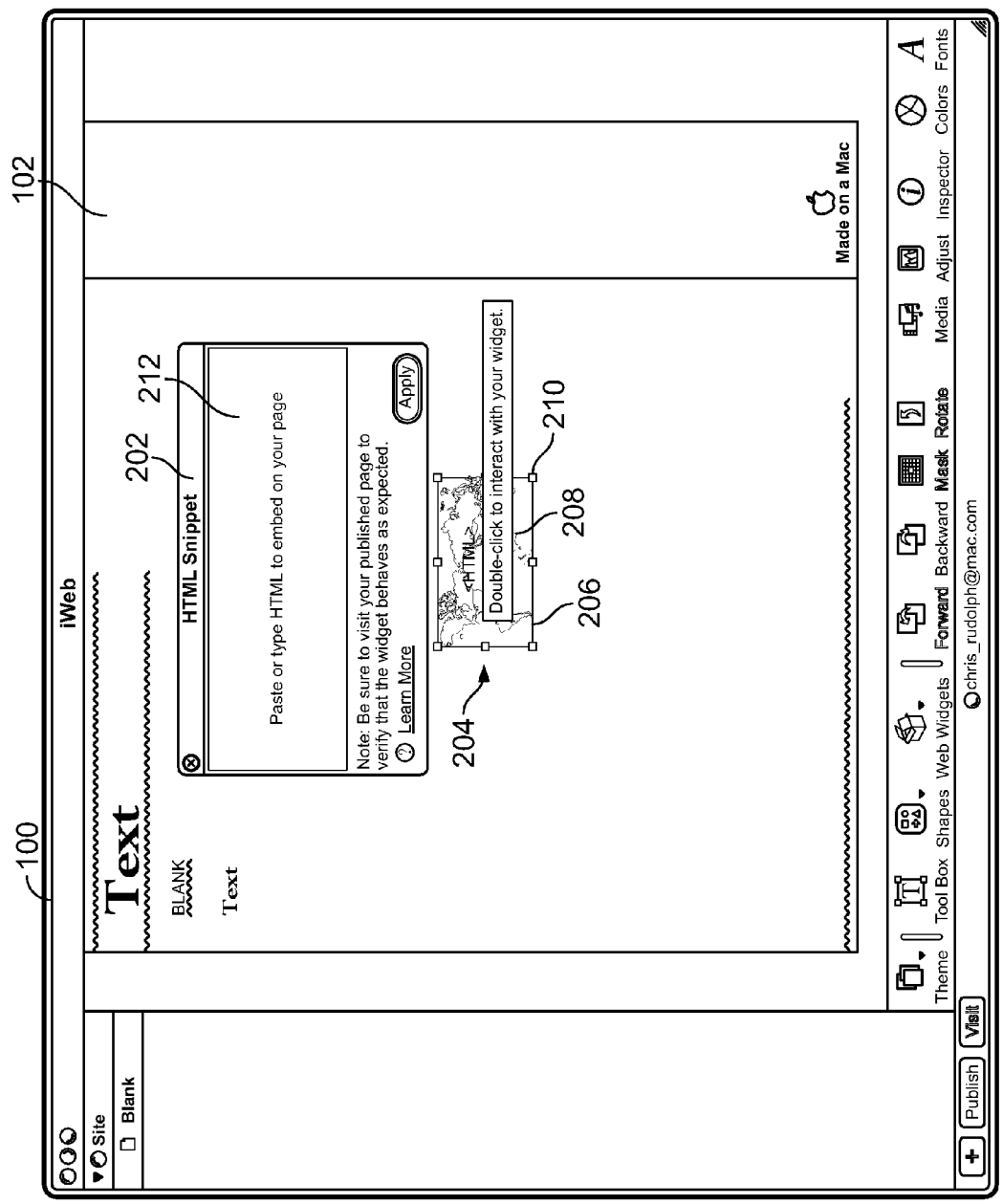
FIGS. 2A and 2B are screen shots of an example web widget and web widget inspector for generating Hypertext Markup Language (HTML) snippets in the media authoring tool of FIG. 1.
Figure 2B:
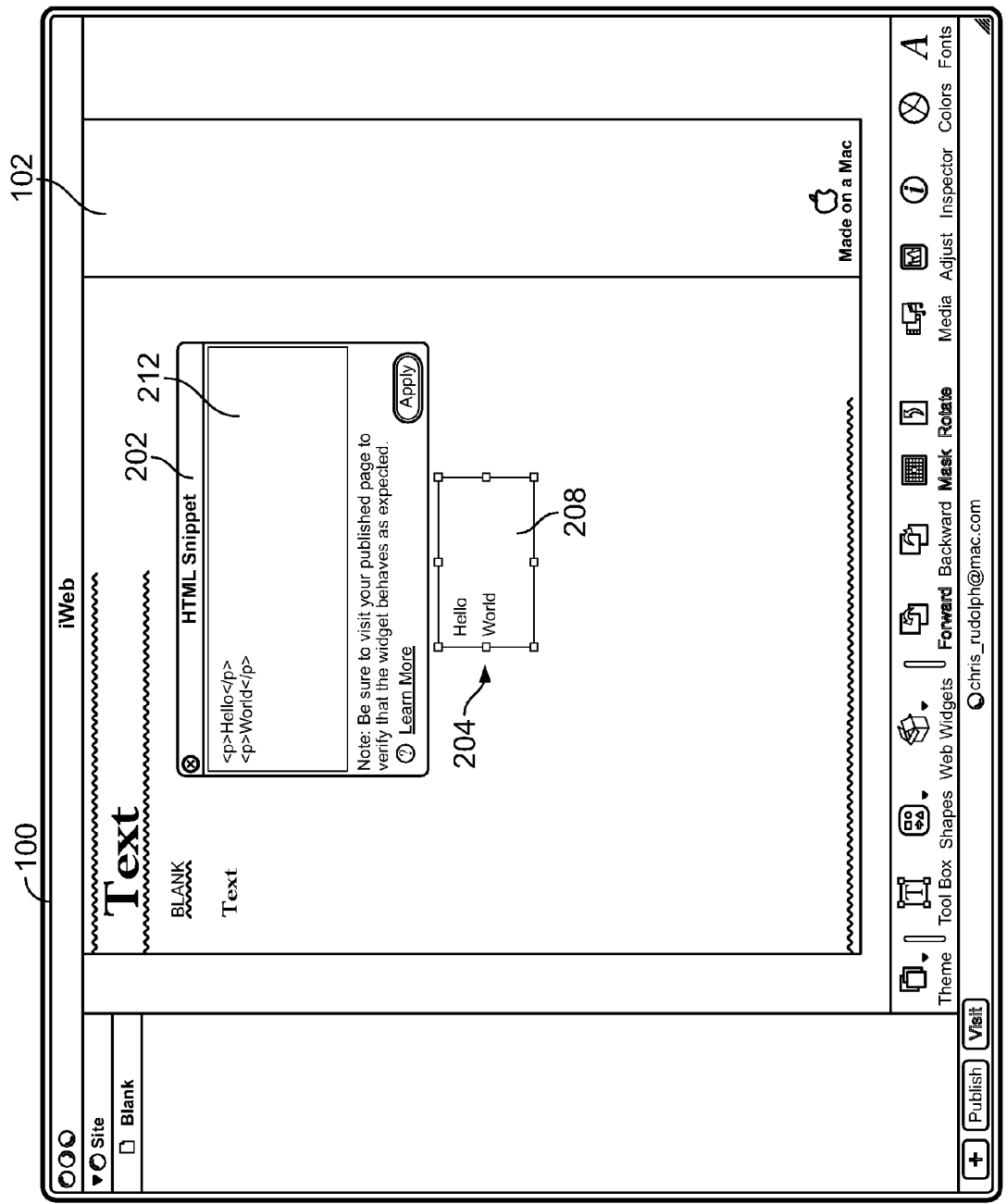

FIGS. 2A and 2B are screen shots of an example web widget 204 and associated web widget inspector 202 for generating HTML snippets in the media authoring tool of FIG. 1. Upon selection of an HTML snippet from the menu 108 or other selection mechanism (e.g., a pull-down menu), the web widget 204 is presented in the user interface 100 as a bounding box 206 enclosing a display area 208. The bounding box 206 can be dragged to any desired position on the page 102. The bounding box can include handles 210 for adjusting the dimensions of the bounding box 206. In some implementations, the user can interact with the widget 204 by double-clicking on the display area 208.

Upon selection of the HTML snippet from the menu 108 or other selection mechanism, the widget inspector 202 is presented on the web page 102. In some implementations, the web inspector 202 includes an editing window 212 for pasting or typing HTML instructions. The user can type one or more HTML instructions in the editing window 212 and click the "Apply" button to have the instructions interpreted and displayed in the display area 208 of the web widget 204.

Referring to FIG. 2B, the user has typed the HTML instruction <p>Hello/p> and <p>World</p> in the editing window 212 of the widget inspector 202. When the user clicks the "Apply" button, the HTML instructions are interpreted and the text "Hello World" is presented in the display area 208 of the web widget 204.

The HTML web widget 204 allows the user to easily generate HTML snippets and immediately see the results of those snippets in a single user interface of the tool. The user does not have to exit the tool or open a new interface which could disrupt the user's workflow. Nor does the user have to publish the page to see how the snippet will be rendered in a browser.

Figure 3A:
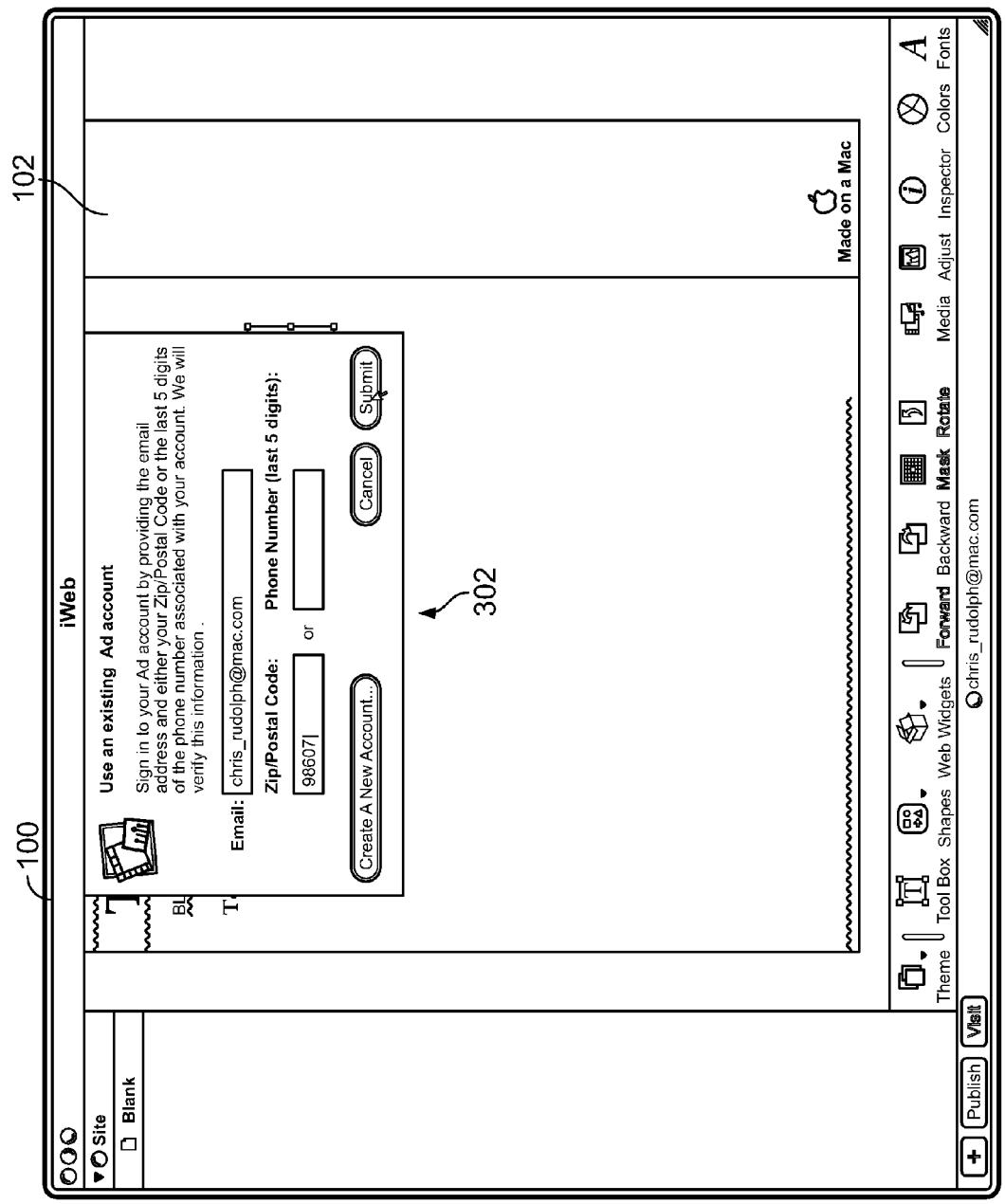
FIGS. 3A and 3B are screen shots of example account dialogs for accessing or creating an advertising account in the media authoring tool of FIG. 1.
Figure 3B:
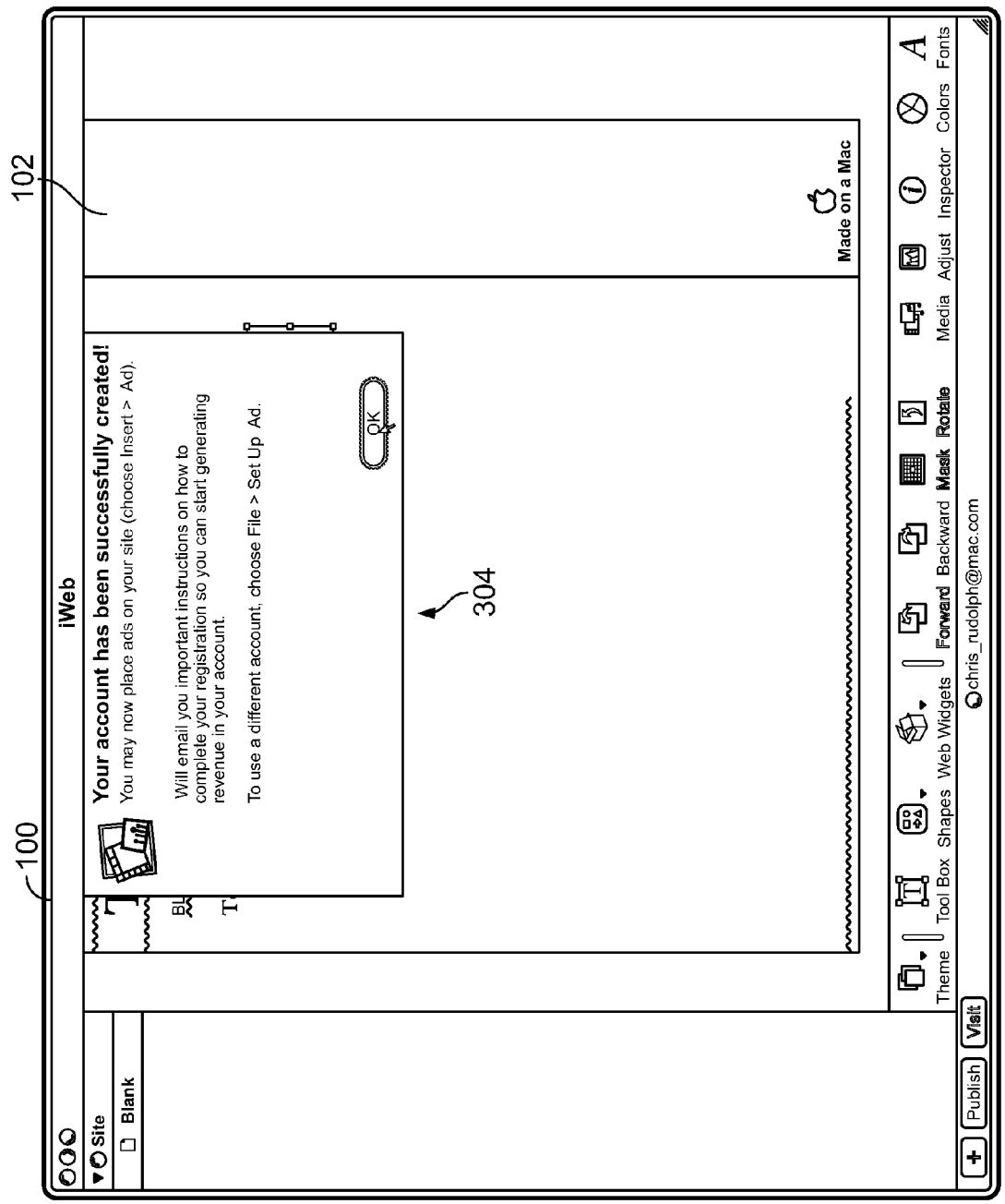

FIGS. 3A and 3B are screen shots of example account dialogs 302, 304, for accessing or creating an advertising account (e.g., a Google AdSense™ account) in the media authoring tool of FIG. 1. Referring to FIGS. 1, 3A and 3B, upon the user's selection of an advertisement ("ad") item from the menu 108 shown in FIG. 1, the account dialog 302 is presented in the user interface 100. In the example shown, the user enters his email address and zip code or phone number to access his existing ad account. In some cases, the user can be provided with a mechanism for creating a new account (e.g., button), which directs the user to further dialogs for setting up an ad account.

FIG. 3B illustrates one possible implementation of an account dialog 304, which can be presented to the user to indicate that a new account was successfully created. Although the examples shown in FIGS. 3A and 3B are related to ad accounts, other account dialogs can be presented for other types of accounts for which access or creation is desired (e.g., email accounts, financial accounts).

Figure 3C:
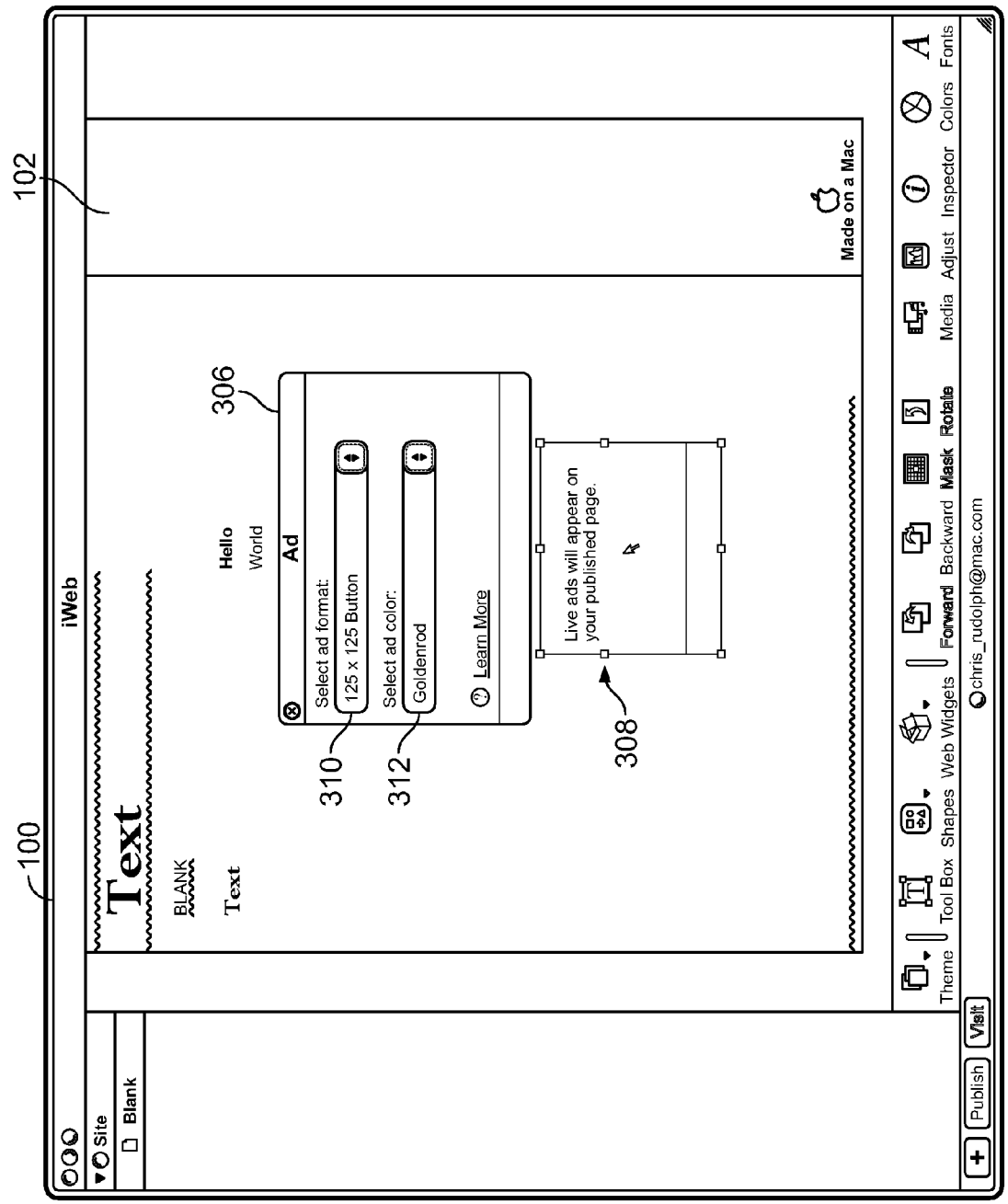
FIG. 3C is a screen shot of an example web widget and web widget inspector for displaying advertisements in the media authoring tool of FIG. 1.

FIG. 3C is a screen shot of an example web widget 308 and web widget inspector 306 for displaying "live" ads in the media authoring tool of FIG. 1. A "live" ad can be an ad that is delivered by an ad server to an ad space on a web page while the page is being viewed in a browser by the user. In some implementations, the widget inspector 306 includes controls 310 and 312, for modifying the size and color of the "live" ad displayed by the web widget 308. Input provided by the user through the widget inspector 306 can be applied to the "live" ad presented by the web widget 308. Other controls can be included in the widget inspector 306 to provide additional control over how an ad is presented on the page.

The ad web widget 308 allows the user to easily interface with an ad service provider, including account access and creation, in a single user interface of the media authoring tool. The user does not have to exit the tool or open a new interface which could disrupt the user's workflow. Nor does the user have to publish the page to see how the ad will be rendered in a browser.

Figure 4:
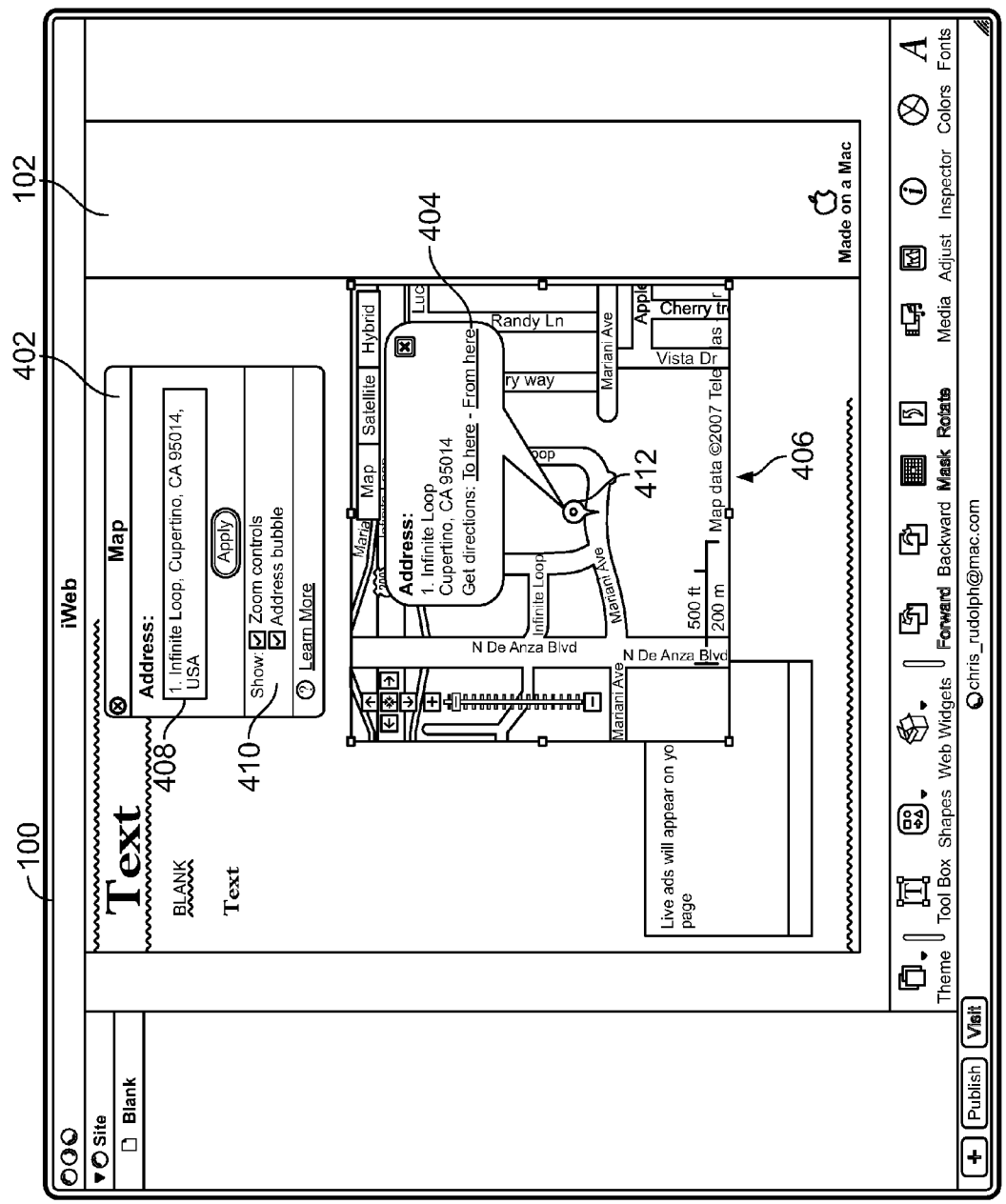
FIG. 4 is a screen shot of an example web widget and web widget inspector for displaying maps in the media authoring tool of FIG. 1.

FIG. 4 is a screen shot of an example web widget 406 and web widget inspector 402 for displaying maps in the media authoring tool of FIG. 1. In the example shown, the user has selected a map web widget from the menu 108, resulting in the presentation of the map widget 406 and associated widget inspector 402 on the page 102. The widget inspector 402 can include a text box 408 for typing or pasting an address. In some implementations, the text box 408 can include a default address which can be specified by the user or the map service. An address in the text box 408 can determine a portion of a map that will be displayed by the widget 406 when an "Apply" button is clicked by the user. Additionally, a placemark (e.g., a pushpin icon) can be overlaid on the map to mark the location of the address in the map. In this example, the user entered "1 Infinite Loop, Cupertino, Calif. 95014, USA" in the text box 408, and after clicking the "Apply" button, a map portion including the address is displayed in the web widget 406 with a placemark 412 to mark the address in the map. Other navigation controls can be included with the widget inspector 402, including navigation controls 410 (e.g., zoom control, address bubble). In some implementations, the map can include one or more links 404 (e.g., hypertext links) to other network resources or to receive additional information. In this example, the controls 410 include check boxes for activating and deactivating the display of zoom controls and an address bubble, respectively. Other controls are possible (e.g., tilt controls). The user can interact with the map by, for example, double-clicking the web widget 406. Once the web widget 406 activated the user can use their mouse (or finger or stylus if a touch-sensitive screen) to move the map from within the web widget 406.

In some implementations, the map can be provided by a map service (e.g., Google™ Maps). The web widget 406 can provide all the supporting code (e.g., HTML, JavaScript®, CSS) for connecting to the map service, sending requests for map data, receiving the map data in response to the requests, and the formatting of map data for presentation in the web widget 406. A communication channel can be established between the web widget 406 and the map service using an operating system (OS) service or a library service provided by the system hosting the media authoring tool. In some implementations, the host system (e.g., a personal computer) can be coupled to the Internet using a wired or wireless communication link. The OS or library service can establish the communication channel using known communication protocols (e.g., TCP/IP, HTML, Secure Socket Layer).

The map web widget 308 allows the user to easily interface with a map service in a single user interface of the media authoring tool. The user does not have to exit the tool or open a new interface which could disrupt the user's workflow. Nor does the user have to publish the page to see how the map will be rendered in a browser.

Figure 5:
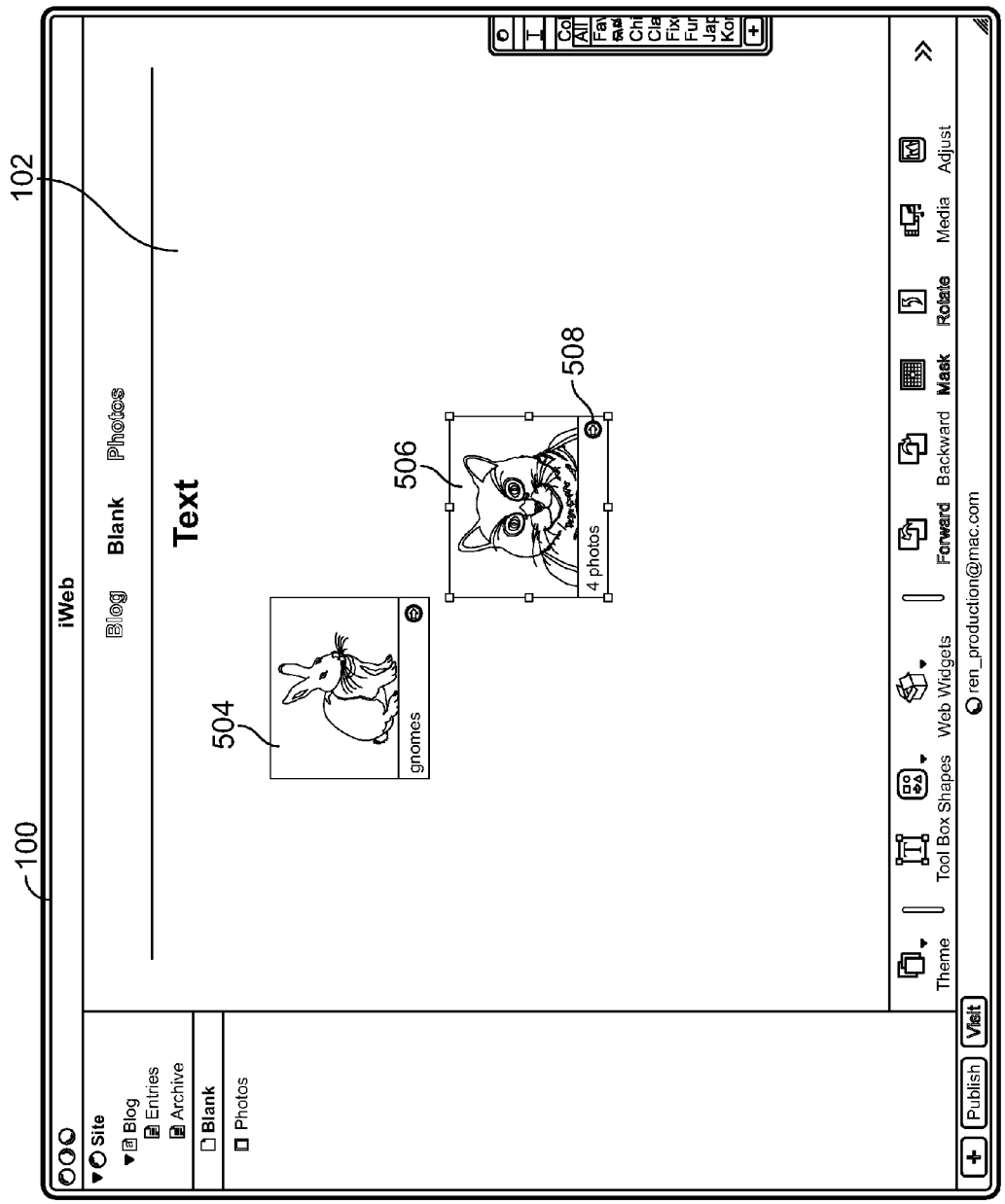
FIG. 5 is a screen shot of example web widgets for displaying and navigating content in the media authoring tool of FIG. 1.

FIG. 5 is a screen shot of example web widgets 504, 506, for displaying content (e.g., digital photos, video clips) in a media authoring tool of FIG. 1. In this example, the user selected a web gallery widget from the menu 108. In response to the selection, the web widgets 504, 506, were presented on the page 102. In some implementations, the web widgets 504, 506, include bounding boxes with handles for resizing the web widgets. In some implementations, the web widgets 504, 506, can include a control 508 for scrolling or navigating through images or videos in a gallery or other file selected by the user. Other controls are possible. For example, if a video clip is to be displayed, then video controls can be included on the widget (e.g., play, forward, reverse, stop, pause). In some implementations, the web widgets 504, 506, can be used to navigate through pages of a document (e.g., a .pdf file).

Example Web Widget Process

Figure 6:
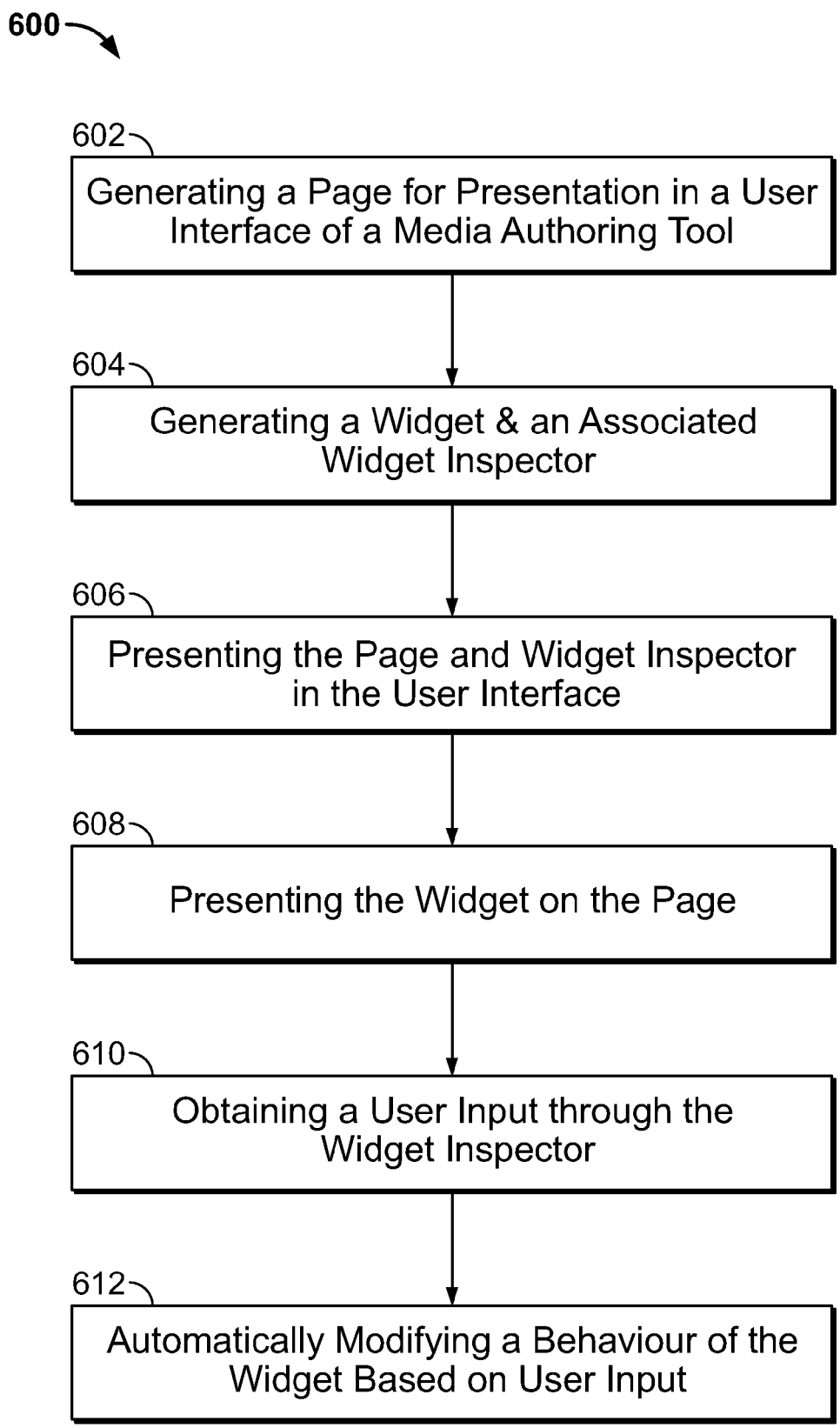
FIG. 6 is a screen shot of example process for implementing the features described in reference to FIGS. 1-5.

FIG. 6 is a screen shot of example process 600 for implementing the features described in reference to FIGS. 1-5. In some implementations, the user invokes a media authoring tool on a host system (e.g., a personal computer). Alternatively, the media authoring tool can be provided on a server. The user selects a blank page or template page. The user also selects a web widget from a menu (e.g., menu 108).

Responsive to the user selection, a page is generated for presentation in a user interface of the media authoring tool (602). A widget and an associated widget inspector are generated (604). The page is presented in the user interface, together with the widget inspector (606). In some implementations, the web widget is presented on the page (608). In other implementations, the web widget can be presented at another location in the user interface, and the user can then move the web widget onto the page (e.g., drag and drop). The web widget can include a bounding box which includes handles for resizing. The web widget and widget inspector can be clicked and dragged to a desired location on the page. The user provides input into the widget inspector by typing, pasting and/or selecting predefined options (610). The behaviour of the web widget can be automatically modified based on the input (612).

Example Software Stack

Figure 7:
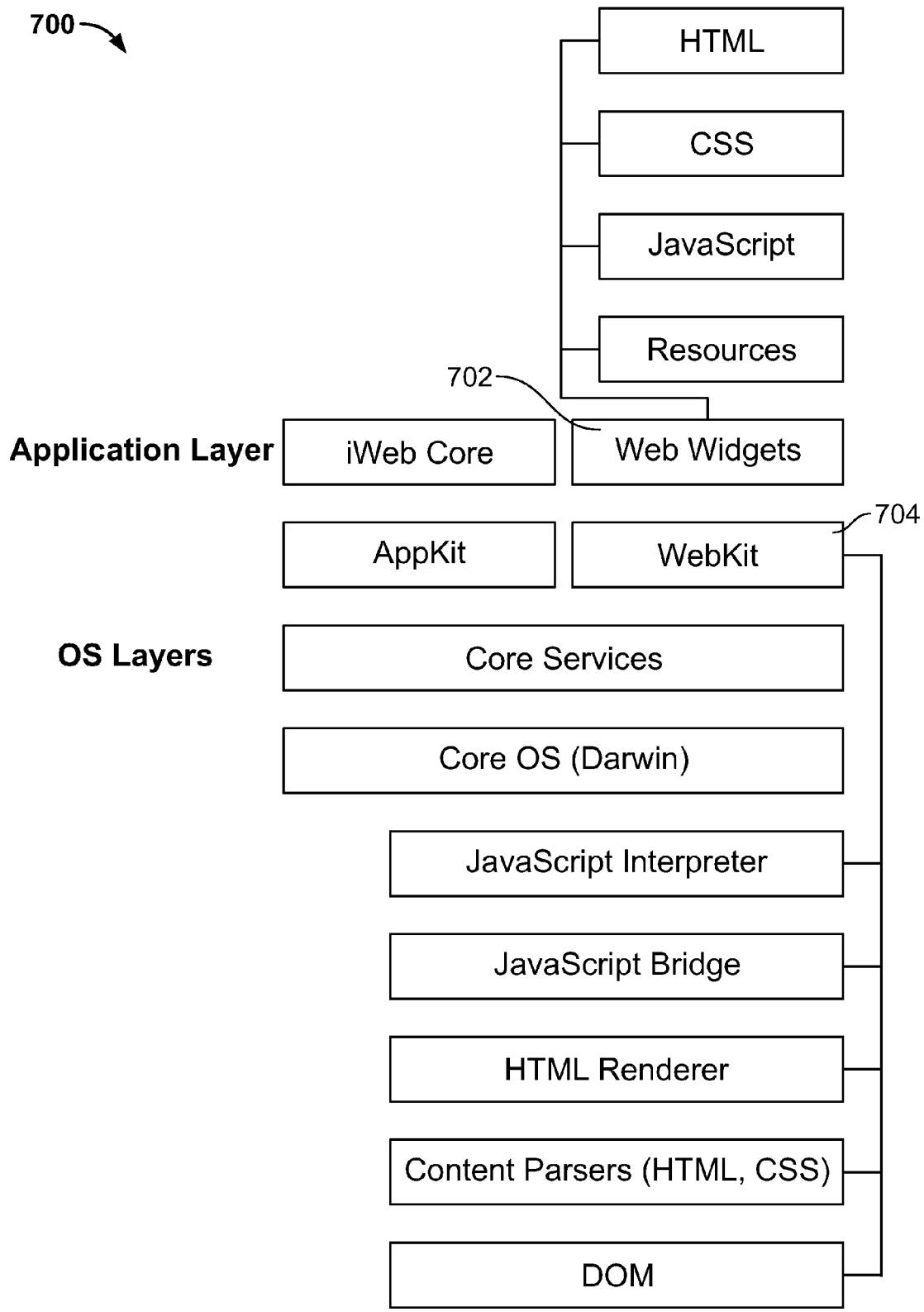
FIG. 7 is a screen shot of example software stack for implementing the features and processes described in reference to FIGS. 1-6.

FIG. 7 is a screen shot of example software stack 700 for implementing the features and processes described in reference to FIGS. 1-6. The software stack 700 is based on the Mac OS® software stack. It should be noted, however, that any software stack can be used to implement the features and processes described in reference to FIGS. 1-6.

The software stack 700 can include an application layer and operating system layers. In this Mac OS® example, the application layer can include iWeb Core and Web Widget applications. The iWeb Core code includes code for the iWeb® website creation tool and the web widget code includes code for implementing web widgets. The web widget code can include HTML, CSS, JavaScript® and other resources. CSS is a stylesheet language used to describe the presentation of a document written in a markup language (e.g., style web pages written in HTML, XHTML). CSS can be used by authors and readers of web pages to define colors, fonts, layout, and other aspects of document presentation. JavaScript® is a scripting language which can be used to write functions that are embedded in or included from HTML pages and interact with a Document Object Model (DOM) of the page.

In some implementations, the web widget code in the application layer uses WebKit® services. WebKit® is an application framework included with Mac OS X which is the basis of Mac OS X's Safari web browser. The framework allows third party developers to easily include Safari functionality in custom applications. WebKit® includes an Objective-C Application Programming Interface (API) that provides the capability to interact with a web server, retrieve and render web pages, download files, and manage plug-ins. WebKit® also includes content parsers (e.g., HTML, CSS), a JavaScript® bridge (e.g., for synchronizing between Safari® and Java applets), a JavaScript® engine (interpreter) and a DOM. The WebKit® can use services provided by Core Services, which provide basic low level services. The Core Services can request services directly from the Core OS (e.g., Darwin/Unix).

The software stack 700 provides the software development tools to create web widgets and the various features and processes described in reference to FIGS. 1-6. Other software stacks and architectures are possible, including architectures having more or fewer layers, different layers or no layers.

Example System Architecture

Figure 8:
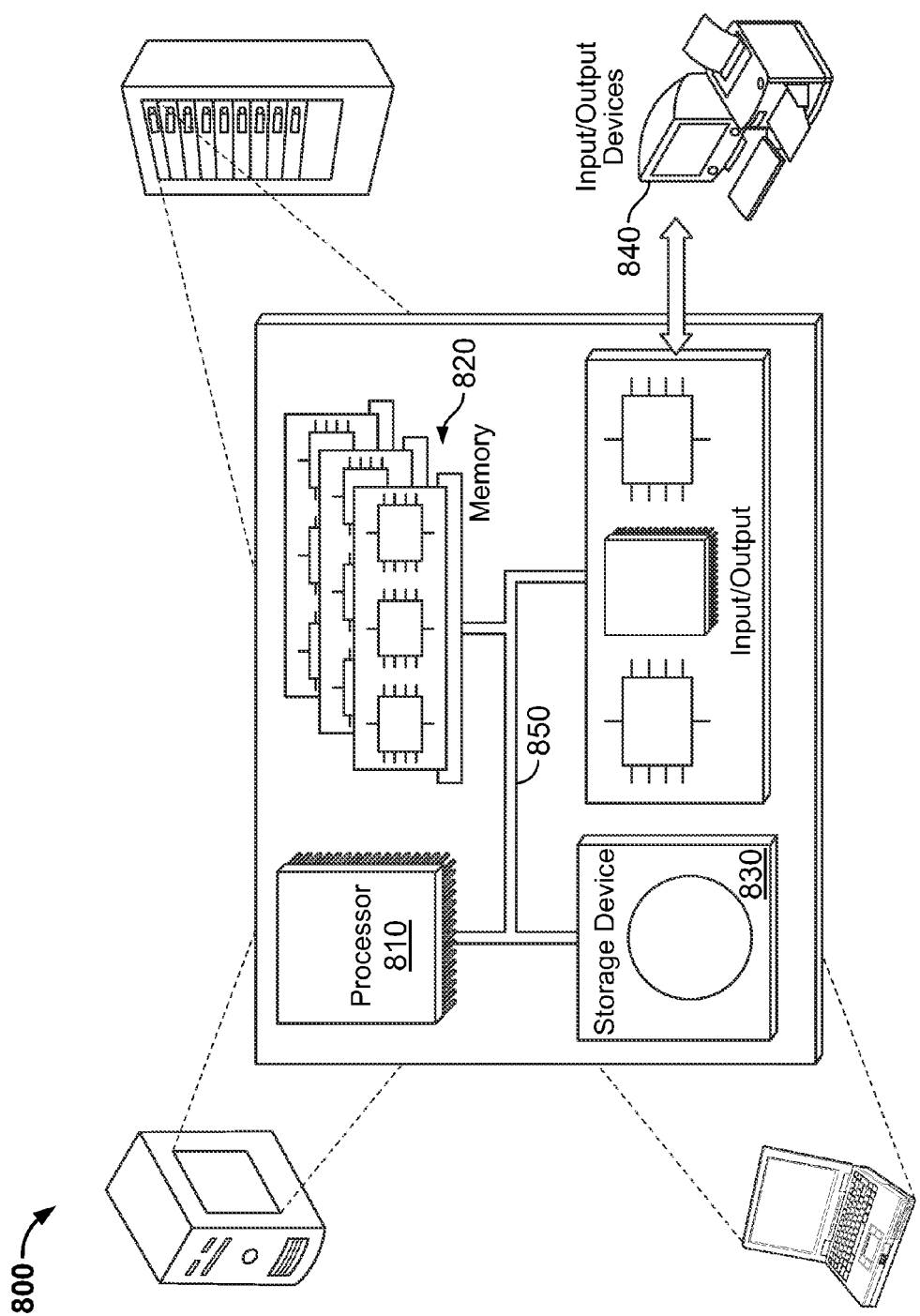
FIG. 8 is a screen shot of example system for implementing the features and processes described in reference to FIGS. 1-7.

FIG. 8 is a screen shot of example system 800 for implementing the features and processes described in reference to FIGS. 1-7. The system 800 may host the software stack 700, described in reference to FIG. 7. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In some implementations, the processor 810 is a single-threaded processor. In other implementations, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. In other implementations, the memory 820 is a volatile memory unit. In yet other implementations, the memory 820 is a non-volatile memory unit.

The storage device 830 is capable of providing mass storage for the system 800. In some implementations, the storage device 830 is a computer-readable medium. In various different implementations, the storage device 830 may be a floppy disk device, a hard disk device, an optical disk device, or a tape device.

The input/output device 840 provides input/output operations for the system 800. In some implementations, the input/output device 840 includes a keyboard and/or pointing device. In other implementations, the input/output device 840 includes a display unit for displaying graphical user interfaces.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the flow diagrams depicted in the figures do not require the particular order shown, or sequential order, to achieve desirable results. In addition, other steps may be provided, or steps may be eliminated, from the described flow diagrams, and other components may be added to, or removed from, the described systems. Accordingly, various modifications may be made to the disclosed implementations and still be within the scope of the following claims.

The invention claimed is:

1. A method comprising:
displaying, in a user interface, a media authoring tool that is operable to create a web page, the media authoring tool comprising a first editing area for editing the web page, wherein the web page is configured to display first content when rendered;
receiving an input for creating a web widget, which is a component of the web page that is operable to display second content when rendered in the web page, the second content being distinct from the first content;
in response to the input, displaying the web widget as a bounding box enclosing a display area in the media authoring tool, wherein dimensions of the bounding box are configurable by a user while creating the web widget;
presenting in the media authoring tool, in association with displaying the bounding box, a second editing area for editing the web widget during creation, the second editing area being associated with a web widget tool operable to edit instructions that are executed for displaying the second content in the web widget when the web page is rendered; and
providing the web page, including the first content and the web widget comprising the second content, for display in the user interface.

2. The method of claim 1, comprising:
automatically establishing a communication channel between the web widget and a service without user intervention;
obtaining the second content from the service for display on the web widget; and
presenting the second content using the web widget when the web page is rendered.

3. The method of claim 2, wherein the second content includes map data.

4. The method of claim 3, comprising:
receiving a user input that is associated with a geographic location; and
displaying a placemark corresponding to the geographic location in the map data.

5. The method of claim 3, wherein the web widget presents one or more navigation controls for allowing the user to navigate the map data.

6. The method of claim 5, wherein at least one navigation control is a zoom control.

7. The method of claim 2, wherein the second content includes advertising information.

8. The method of claim 7, comprising:
modifying a presentation of the advertising information through the web widget based on a user input.

9. The method of claim 8, wherein the modifying includes modifying a size or color of the advertising information.

10. The method of claim 2, comprising:
providing one or more account dialogs for display, the one or more account dialogs allowing a user to access or create one or more accounts with the service.

11. The method of claim 1, wherein the web widget is a page element of the web page and is provided for display in association with other page elements of the web page.

12. The method of claim 1, wherein the web widget is operable to present content configured to directly interact with a user through the web widget.

13. The method of claim 1, wherein the instructions include a markup language instruction and the web widget renders the markup language instruction.

14. The method of claim 1, wherein the web widget tool is operable to specify the second content displayed in the web widget.

15. The method of claim 14, wherein specifying the second content includes at least one of creating the second content or specifying a source of the second content.

16. The method of claim 1, comprising:
determining a location of the web widget in the web page; and
placing the second editing area at the determined location in the first editing area.

17. The method of claim 1, comprising:
receiving a drag and drop input placing the bounding box in the first editing area at a first location, wherein providing the web page for display includes providing the second content of the web widget for display at the first location.

18. The method of claim 1, wherein presenting the second editing area for editing the web widget during creation comprises:
receiving a second input for editing the instructions that are executed for displaying the second content; and
updating the second content that is displayed in the web widget when the web page is rendered in response to editing the instructions.

19. The method of claim 18, comprising:
displaying the first content unchanged in the web page when the web page is rendered.

20. A computer-readable medium having first instructions stored thereon, which, when executed by a processor, cause the processor to perform operations comprising:
displaying, in a user interface, a media authoring tool that is operable to create a web page, the media authoring tool comprising a first editing area for editing the web page during creation, wherein the web page is configured to display first content when rendered;

receiving an input for creating a web widget, which is a component of the web page that is operable to display second content when rendered in the web page, the second content being distinct from the first content;

in response to the input, displaying the web widget as a bounding box enclosing a display area in the media authoring tool, wherein dimensions of the bounding box are configurable by a user while creating the web widget;

presenting in the media authoring tool, in association with displaying the bounding box, a second editing area for editing the web widget during creation, the second editing area being associated with a web widget tool operable to edit second instructions that are executed for displaying the second content in the web widget when the web page is rendered; and providing the web page, including the first content and the web widget comprising the second content, for display in the user interface.

21. The computer-readable medium of claim 20, wherein the first instructions cause the processor to perform operations comprising:

automatically establishing a communication channel between the web widget and a service without user intervention;

obtaining the second content from the service for display on the web widget; and presenting the second content using the web widget when the web page is rendered.

22. The computer-readable medium of claim 21, wherein the second content includes map data.

23. The computer-readable medium of claim 21, wherein the second content includes advertising information.

24. The computer-readable medium of claim 21, wherein the first instructions cause the processor to perform operations comprising:

providing one or more account dialogs for display, the one or more account dialogs allowing a user to access or create one or more accounts with the service.

25. The computer-readable medium of claim 20, wherein the web widget is operable to present content configured to directly interact with a user through the web widget.

26. The computer-readable medium of claim 20, wherein the second instructions include a markup language instruction and the web widget renders the markup language instruction.

27. The computer-readable medium claim 20, wherein displaying the web widget as a bounding box in the media authoring tool comprises displaying the web widget as a bounding box that is overlaid on the web page, and wherein presenting the second editing area comprises presenting the second editing area as an overlay on the first editing area.

28. A system comprising:

one or more computers configured to perform operations comprising:

displaying, in a user interface, a media authoring tool that is operable to create a web page, the media authoring tool comprising a first editing area for editing the web page during creation, wherein the web page is configured to display first content when rendered;

receiving an input for creating a web widget, which is a component of the web page that is operable to display second content when rendered in the web page, the second content being distinct from the first content;

in response to the input, displaying the web widget as a bounding box enclosing a display area in the media authoring tool, wherein dimensions of the bounding box are configurable by a user while creating the web widget;

presenting in the media authoring tool, in association with displaying the bounding box, a second editing area for editing the web widget during creation, the second editing area being associated with a web widget tool operable to edit instructions that are executed for displaying the second content in the web widget when the web page is rendered; and providing the web page, including the first content and the web widget comprising the second content, for display in the user interface.

29. The system of claim 28, wherein the one or more computers are configured to perform operations comprising:

automatically establishing a communication channel between the web widget and a service without user intervention;

obtaining the second content from the service for display on the web widget; and presenting the second content using the web widget when the web page is rendered.

30. The system of claim 28, wherein displaying the web widget as a bounding box in the media authoring tool comprises displaying the web widget as a bounding box that is overlaid on the web page, and wherein presenting the second editing area comprises presenting the second editing area as an overlay on the first editing area.

31. The method of claim 1, wherein displaying the web widget as a bounding box in the media authoring tool comprises displaying the web widget as a bounding box that is overlaid on the web page, and wherein presenting the second editing area comprises presenting the second editing area as an overlay on the first editing area.

* * * * *